US006205582B1

(12) United States Patent
Hoarty

(10) Patent No.: US 6,205,582 B1
(45) Date of Patent: Mar. 20, 2001

(54) INTERACTIVE CABLE TELEVISION SYSTEM WITH FRAME SERVER

(75) Inventor: W. Leo Hoarty, Morgan Hill, CA (US)

(73) Assignee: ICTV, Inc., Los Gatos, CA (US)

( * ) Notice: Subject to any disclaimer, the term of this patent is extended or adjusted under 35 U.S.C. 154(b) by 0 days.

(21) Appl. No.: 09/156,845

(22) Filed: Sep. 18, 1998

Related U.S. Application Data

(60) Provisional application No. 60/067,990, filed on Dec. 9, 1997.

(51) Int. Cl.$^7$ .............................. H04N 7/173; H04N 7/16
(52) U.S. Cl. .............................. 725/93; 725/116; 725/146
(58) Field of Search .............................. 348/6, 7, 12, 13; 709/219, 217; 455/3.1, 4.1, 4.2, 5.1; 370/353, 486, 487, 352, 401

(56) References Cited

U.S. PATENT DOCUMENTS

| | | |
|---|---|---|
| 4,247,106 | 1/1981 | Jeffers et al. . |
| 4,264,924 | 4/1981 | Freeman . |
| 4,264,925 | 4/1981 | Freeman et al. . |
| 4,290,142 | 9/1981 | Schnee et al. . |
| 4,302,771 | 11/1981 | Gargini . |
| 4,350,980 | 9/1982 | Ward . |
| 4,367,557 | 1/1983 | Stern et al. . |
| 4,395,780 | 7/1983 | Gohm et al. . |
| 4,450,477 | 5/1984 | Lovett . |
| 4,454,538 | 6/1984 | Toriumi . |
| 4,475,123 | 10/1984 | Dumbauld et al. . |
| 4,491,983 | 1/1985 | Pinnow et al. . |
| 4,506,387 | 3/1985 | Walter . |
| 4,507,680 | 3/1985 | Freeman . |
| 4,533,948 | 8/1985 | McNamara et al. . |
| 4,536,791 | 8/1985 | Campbell et al. . |
| 4,538,174 | 8/1985 | Gargini et al. . |

(List continued on next page.)

FOREIGN PATENT DOCUMENTS

| | | |
|---|---|---|
| 0 419 137 B1 | 9/1990 | (EP) . |
| 0 523 618 A2 | 7/1992 | (EP) . |
| 0 594 350 A1 | 10/1993 | (EP) . |
| 0 624 039 A2 | 11/1994 | (EP) . |
| 2-17776 | 1/1990 | (JP) . |
| WO 89/08967 | 9/1989 | (WO) . |
| WO 90/13972 | 11/1990 | (WO) . |
| WO 93/22877 | 11/1993 | (WO) . |
| WO 94/16534 | 7/1994 | (WO) . |
| WO 95/15658 | 6/1995 | (WO) . |
| WO 95/32587 | 11/1995 | (WO) . |
| WO 97/33434 | 9/1997 | (WO) . |

OTHER PUBLICATIONS

Insight Product Literature.

"Two–way applications for cable television systems in the '70s", Ronald K. Jurgen; An IEEE Spectrum applications report, Nov. 1971.

"Design of a Switched Broad–Band Communications Network for Interactive Services", IEEE Transactions on Communikcations, vol. com–23, No. 1, Jan. 1975, pp. 49–55.

"An Integrated Network Using Fiber Optics (Info) for the Distribution of Video, Data, and Telephone in Rural Areas", IEEE Transactions on Communications, vol. com–26, No. 7, Jul. 1978, pp. 1037–1045.

(List continued on next page.)

Primary Examiner—Andrew Faile
Assistant Examiner—Kieu-Oanh Bui
(74) Attorney, Agent, or Firm—Bromberg & Sunstein LLP

(57) ABSTRACT

In an interactive cable system having a plurality of assignable interactive controllers which communicate with subscribers through an information service distribution network, a frame server is provided for interfacing with a plurality of subscribers. A system manager assigns either the frame server or one of the plurality of interactive controllers to subscribers requesting interactive service. The frame server preferably delivers interactive pages which need only be transmitted intermittently, such as still frame images.

9 Claims, 21 Drawing Sheets

U.S. PATENT DOCUMENTS

| | | |
|---|---|---|
| 4,538,176 | 8/1985 | Nakajima et al. . |
| 4,573,072 | 2/1986 | Freeman . |
| 4,602,279 | 7/1986 | Freeman . |
| 4,625,235 | 11/1986 | Watson . |
| 4,627,105 | 12/1986 | Ohashi et al. . |
| 4,633,462 | 12/1986 | Stifle et al. . |
| 4,695,880 | 9/1987 | Johnson et al. . |
| 4,706,121 | 11/1987 | Young . |
| 4,734,764 | 3/1988 | Pocock et al. . |
| 4,749,992 | 6/1988 | Fitzemeyer et al. . |
| 4,750,036 | 6/1988 | Martinez . |
| 4,792,849 | 12/1988 | McCalley et al. . |
| 4,805,134 | 2/1989 | Calo et al. . |
| 4,807,031 | 2/1989 | Broughton et al. . |
| 4,829,372 | 5/1989 | McCalley et al. . |
| 4,829,558 | 5/1989 | Welsh . |
| 4,847,698 | 7/1989 | Freeman . |
| 4,847,699 | 7/1989 | Freeman . |
| 4,847,700 | 7/1989 | Freeman . |
| 4,860,379 | 8/1989 | Schoeneberger et al. . |
| 4,876,592 | 10/1989 | Von Kohorn . |
| 4,890,320 | 12/1989 | Monslow et al. . |
| 4,891,694 | 1/1990 | Way . |
| 4,901,367 | 2/1990 | Nicholson . |
| 4,905,094 | 2/1990 | Pocock et al. . |
| 4,912,760 | 3/1990 | West, Jr. et al. . |
| 4,918,516 | 4/1990 | Freeman . |
| 4,937,821 | 6/1990 | Boulton . |
| 4,941,040 | 7/1990 | Pocock et al. . |
| 4,947,244 | 8/1990 | Fenwick et al. . |
| 4,961,211 | 10/1990 | Tsugane et al. . |
| 4,975,771 | 12/1990 | Kassatly . |
| 4,995,078 | 2/1991 | Monslow et al. . |
| 5,014,125 | 5/1991 | Pocock et al. . |
| 5,027,400 | 6/1991 | Baji et al. . |
| 5,051,822 | 9/1991 | Rhoades . |
| 5,093,718 | 3/1992 | Hoarty et al. . |
| 5,119,188 | 6/1992 | McCalley et al. . |
| 5,130,792 | 7/1992 | Tindell et al. . |
| 5,133,079 | 7/1992 | Ballantyne et al. . |
| 5,136,411 | 8/1992 | Paik et al. . |
| 5,172,413 | 12/1992 | Bradley et al. . |
| 5,191,410 | 3/1993 | McCalley et al. . |
| 5,220,420 | 6/1993 | Hoarty et al. . |
| 5,236,199 | 8/1993 | Thompson, Jr. . |
| 5,253,341 | 10/1993 | Rozmanith et al. . |
| 5,319,455 | 6/1994 | Hoarty et al. . |
| 5,321,514 | 6/1994 | Martinez . |
| 5,355,162 | 10/1994 | Yazolino et al. . |
| 5,359,601 | 10/1994 | Wasilewski et al. . |
| 5,371,532 | 12/1994 | Gelman et al. . |
| 5,404,393 | 4/1995 | Remillard . |
| 5,410,344 | 4/1995 | Graves et al. . |
| 5,412,720 | 5/1995 | Hoarty . |
| 5,418,559 | 5/1995 | Blahut . |
| 5,422,887 * | 6/1995 | Diepstraten et al. ............... 370/85.1 |
| 5,442,389 | 8/1995 | Blahut et al. . |
| 5,446,490 | 8/1995 | Blahut et al. . |
| 5,469,283 | 11/1995 | Vinel et al. . |
| 5,469,431 | 11/1995 | Wendorf et al. . |
| 5,495,295 | 2/1996 | Long . |
| 5,526,034 | 6/1996 | Hoarty et al. . |
| 5,539,449 * | 7/1996 | Blahut et al. ............................. 348/7 |
| 5,548,340 | 8/1996 | Bertram . |
| 5,550,578 | 8/1996 | Hoarty et al. . |
| 5,561,708 | 10/1996 | Remillard . |
| 5,570,126 * | 10/1996 | Blahut et al. ............................. 348/7 |
| 5,587,734 | 12/1996 | Lauder et al. . |
| 5,631,693 | 5/1997 | Wunderlich et al. ..................... 348/7 |
| 5,668,592 | 9/1997 | Spaulding, II ......................... 348/13 |
| 5,961,603 * | 10/1999 | Kunkel et al. ....................... 709/229 |
| 5,995,488 * | 11/1999 | Kalkunte et al. .................... 370/232 |

OTHER PUBLICATIONS

"Proposal for a Hub Controlled Cable Television System Using Optical Fiber", Clifford B. Schrock, IEEE Transactions on Cable Television, vol. catv–4, No. 2, Apr. 1979, pp. 70–77.

"INDAX: An Operational Interactive Cabletext System", IEEE Journal on Selected Areas in Communications, vol. sac–1, No. 2, Feb. 1983, pp. 285–294.

"The Broadband Solution—Metropolitan CATV Networks", Proceedings of Videotex '84, Apr. 1984, all pages.

"Distributed Switching for Data Transmission over Two–Way CATV", Tarek N. Saadawi, Senior Member, IEEE and Mischa Schwartz, Fellow, IEEE, 1985, IEEE.

Japanese Patent No. 63–33988, Michio Kuribayashi, Jul. 28, 1986"Picture Signal Supply System".

"Video on Demand Without Compression: A Review of The Business Model, Regulation and Future Implication", Jack A. M. Van der Star, Chairman, Image Systems Corporation, 305–12886 78th Ave., Surrey B.C., Canada.

"The application of Optical Systems for Cable TV", M. Welzenbach and B. Wiest, AEG–Telefunken, Backnang, Federal Republic of Germany, IEEE LCS Magazine, Feb. 1990.

"Tapped Fiber vs. Fiber–Reinforced Coaxial CATV Systems", David Large, IEEE Magazine, Feb. 1990.

"Photonics for Cable Television System Design", Stephen D. Dukes, Communications Engineering and Design, May 1992.

"Videotex (Data Transmission System)", Jan Gecsei, Chapter 6, "Topology of Videotex Networks", 1983 by Prentice–Hall, Inc.

"A Passive Optical/Coax Hybrid Network Architecture for Delivery of CATV, Telephony and Data Services", Dr. M. Farooque Mesiya, 1993 NCTA Technical Papers.

"DTMF–TV, The Most Economical Approach to Interactive TV", Jack Thompson, Pres. & CEO, GNOSTECH Incorporated, NCF '95 Session T–38–C.

"The Awakening™ 3.0", by John W. Thompson, Jr., 995 The National Academy of Sciences.

"The Smart Headend—A Novel approach to Interactive Television", by W. Leo Hoarty, Pres. & Chief Technical Officer, ICTV, Inc., 1994, 1995 ICTV, Inc.—All Rights Reserved, Presented to the Montreux Int'l TV Symposium—Jun. 9, 1995, pp. 1–21.

* cited by examiner

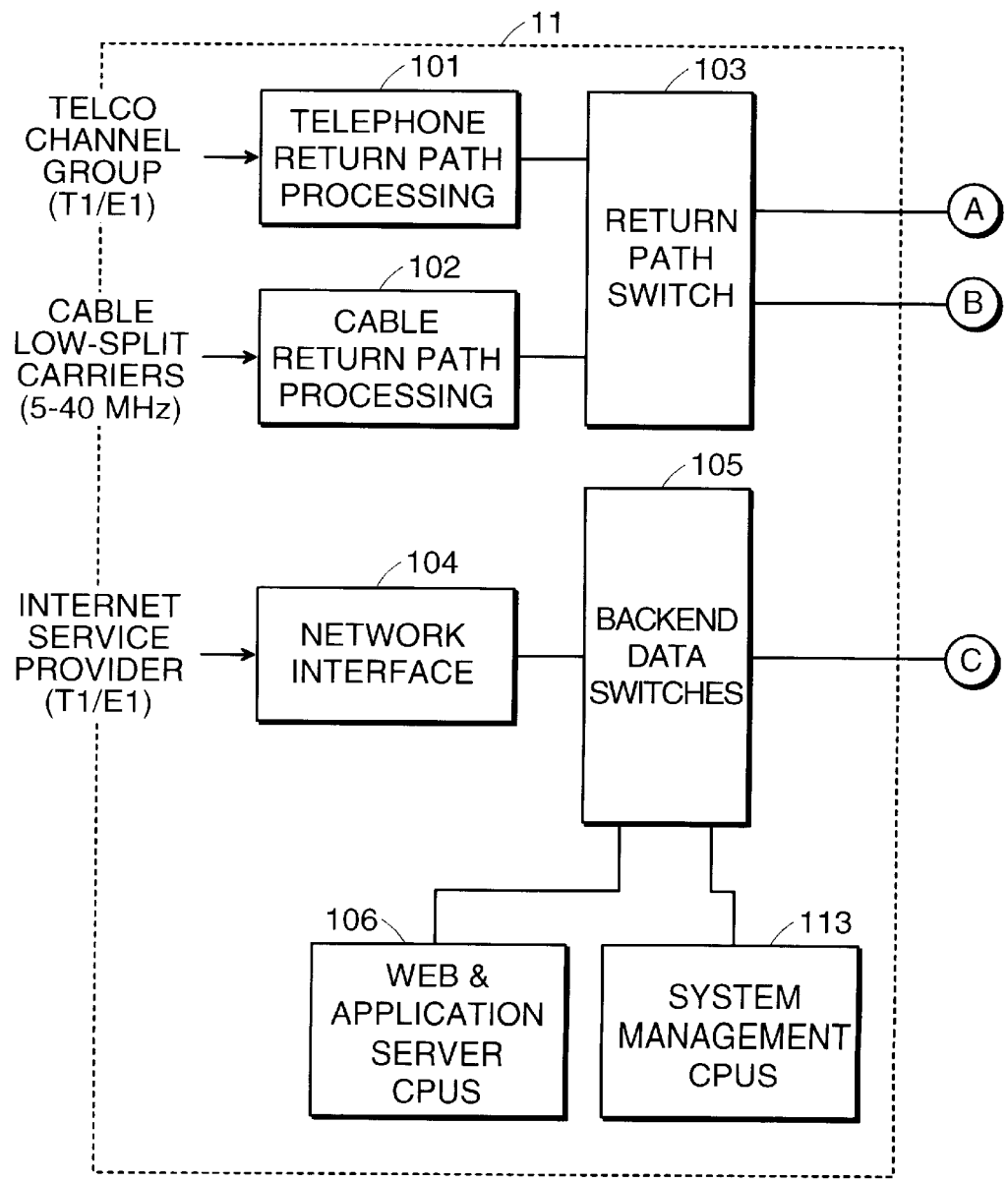

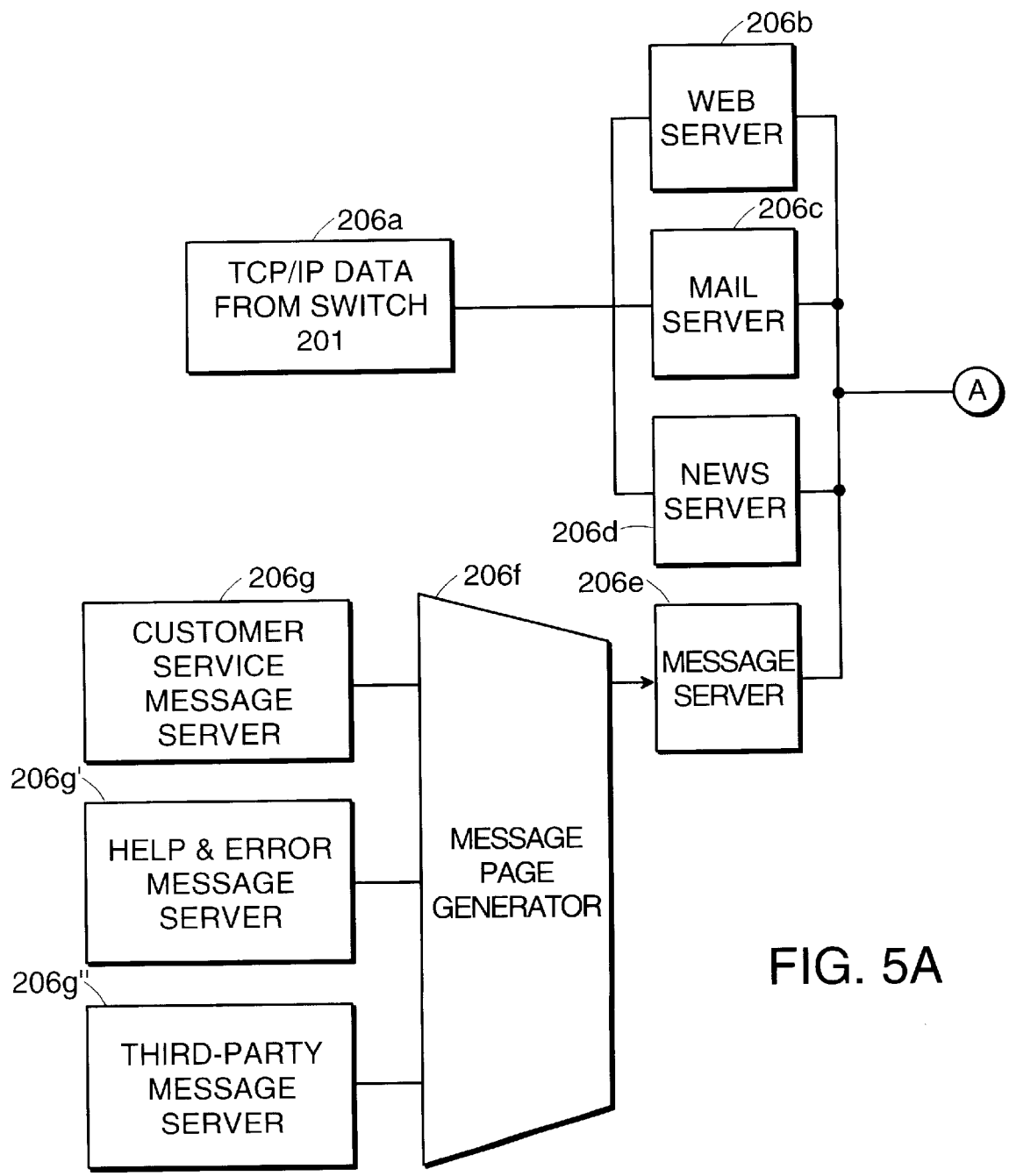

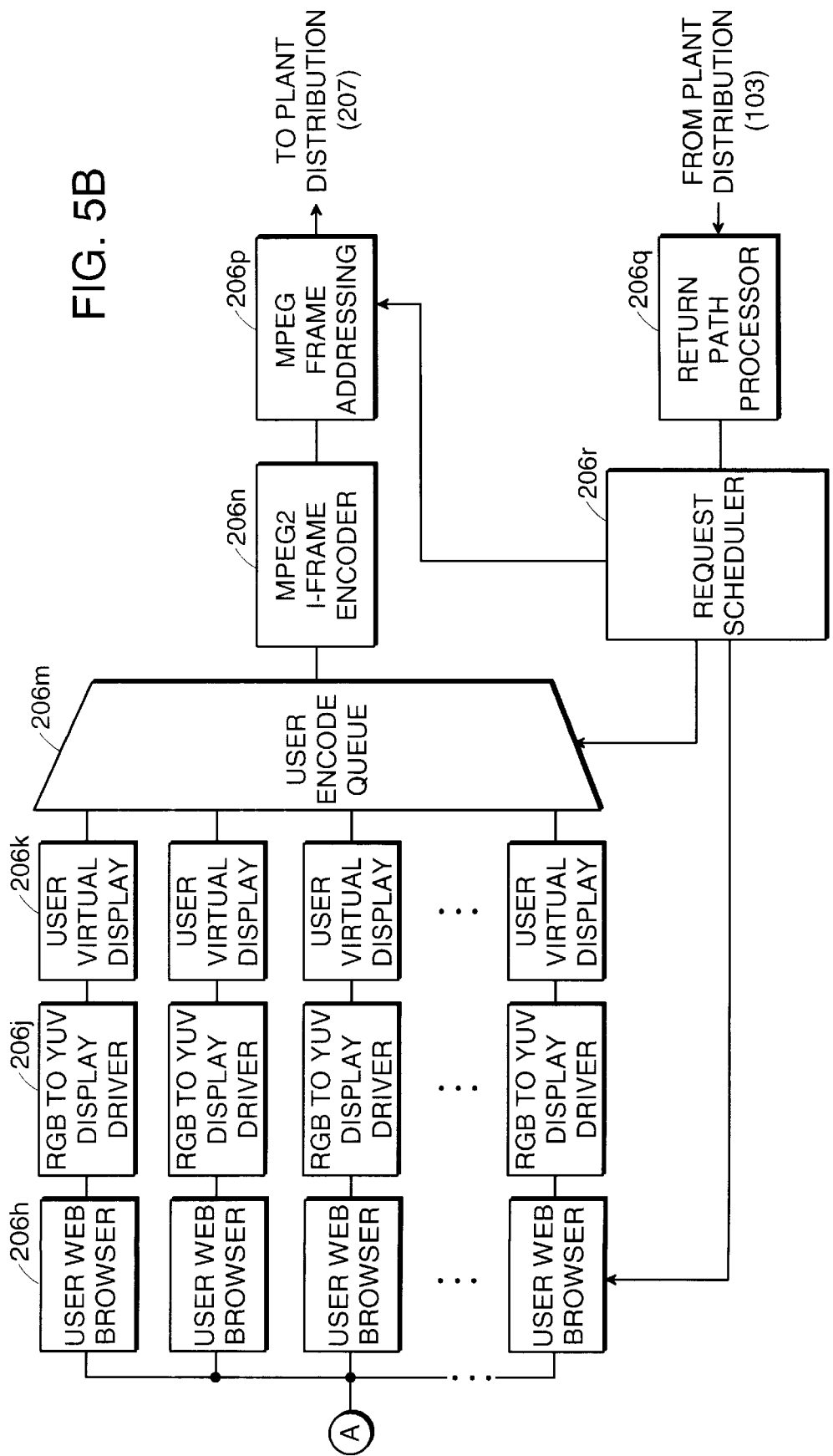

INTERACTIVE CABLE TELEVISION SYSTEM WITH FRAME SERVER

This application claims priority from co-pending U.S. Provisional Application No. 0/067,990, filed Dec. 9, 1997, the full disclosure of which is hereby incorporated by reference herein.

FIELD OF INVENTION

This invention relates to cable television systems, particularly those providing private channels on demand to users for interactive-type services.

BACKGROUND ART

Bandwidth problems have long restricted the ability of cable television systems to provide private information services to subscribers. Such information services may include Internet access, video-on-demand, games, catalogs, etc. Private services may also include allowing the user to select from among hundreds of less popular programming that is thus made available only on a demand basis. One solution to the limits on system bandwidth has been to assign a portion of cable system bandwidth to conventional or popular channels that are universally broadcast to all subscribers. The remaining available channels are then available for assignment to requesting subscribers on a demand basis.

One such system for providing interactive services on a demand basis is described in U.S. Pat. No. 5,550,578. The full disclosure of this reference is hereby incorporated by reference herein. Basically the cable service distribution network divides the subscriber pool into various service areas, each served by a different trunk. A first group of channels broadcast to all service areas may provide conventional channels on channels 2 to 73 for example. A second group of channels, 74 to 79, for example, may be reserved for private information services. While the information on channels 2 to 73 is the same in each service area, the information on channels 74 to 79 is different in each service area. Of these channels, those that are in use are individually assigned to requesting subscribers. Subscribers receiving analog signals will use a full channel, those receiving digital signals will share the assigned channel with other subscribers on a packet addressed or time shared basis. A subscriber in one service area may be interacting on channel 74 at the same time a different subscriber in a different service area was also assigned to channel 74. The headend is equipped with the necessary processing, switching or splitting and combining systems for setting up these private channels on demand. Once assigned a channel for interactive services, the subscriber can request from any of a number of interactive services. Different interactive services may be accessed by the user requesting a different channel. For example, channels 80 to 300 can be virtual channels each of which accesses a different interactive service. As the subscriber continues to change channels among the interactive alternatives, the program being watched will change but the subscriber will remain tuned to the assigned channel for receiving interactive services. The information services can thus be provided to a subscriber over virtual channels in which the channel number changes for different interactive information services, even though the various information services may be provided over a fixed frequency input to the set top. The control data from the subscriber is set top can cause the back end to supply a different information service as the subscriber appears to be changing the channel.

In the system of U.S. Pat. No. 5,550,578, the headend includes a finite number of interactive controllers (or processors) for assignment to subscribers requesting interactive service. The interactive controllers are often dedicated to a particular type of interactive service whether it be Internet access, games, catalog shopping, movies or other service. Thus for interactive service as a whole and particularly for given types of interactive services the available resources at the headend in the form of interactive controllers is limited. It is expensive and therefore undesirable to provide a full complement of interactive controllers for each given type of interactive service for each service area.

SUMMARY OF THE INVENTION

The present invention is directed to an interactive cable system in which a frame server is included in the headend along with a plurality of assignable interactive controllers. The frame server of an embodiment of the invention interfaces with a plurality of home interface controllers. Each home interface controller is associated with a subscriber television and a subscriber selection device that permits subscriber interaction. The frame server generates display images to be supplied to the subscriber television associated with the assigned home interface controller in a digital television signal over the cable system's information service distribution network. The display images from the frame server are preferably limited to interactive pages as defined herein. The subscriber selection device of a home interface controller assigned to the frame server can communicate with the frame server through a transmitter in the home interface controller and over a data communication link. The data communication link is typically either a frequency band on the cable distribution network or the telephone lines.

The plurality of interactive controllers also at the headend each receive data communications from an assigned home interface controller. The interactive controller generates information signals to be supplied over television signals through the information service distribution network to the subscriber television of the assigned home interface controller. A system manager in the headend is in data communication with the home interface controllers so that it can assign the frame server or one of the interactive controllers to a home interface controller requesting interactive service.

The frame server advantageously accommodates a large number of subscribers requesting interactive service so that the overall demand for interactive controllers is reduced. Such a system can be cost effectively built with fewer interactive controller cards and modules than would otherwise be needed to satisfy subscriber demand for interactive services. Other objects and advantages of the present invention will become apparent during the following description of the presently preferred embodiments of the present invention taken in conjunction with the drawings.

BRIEF DESCRIPTION OF THE DRAWINGS

FIG. 5 is a block diagram of a frame server for use in the headend of FIG. 1.

DETAILED DESCRIPTION OF SPECIFIC EMBODIMENTS

For the purposes of the description herein and the claims that follow it, unless the context otherwise requires, the terms "cable television environment" and "cable television system" include all integrated systems for delivery of any information service to subscribers for use in connection with their televisions. These include conventional cable television systems utilizing coaxial cable for distribution primarily of broadcast and paid television programming, cable television systems using fiber optics and mixed fiber optic-coaxial cable, as well as other means for distribution of information services to subscribers. Similarly, unless the context otherwise requires, the term "information service" includes any service capable of being furnished to a television viewer having an interface permitting (but not necessarily requiring) interaction with a facility of the cable provider, including but not limited to an interactive information service, video on demand, Internet access, local origination service, community event service, regular broadcast service, etc. "Television communication" means providing an information service via a television information signal. A "television information signal" is any signal that may be utilized by a television for video display, regardless of the form, including a standard NTSC-modulated rf carrier, an MPEG-compressed digital data stream, or any other format. "Interactive television service" means an information service that utilizes an interface affording two-way communication with a facility of the cable provider. When a home interface controller is said to be in an "interactive mode," it means that the interactive television information system is providing an information service to the home interface controller. "Interactive pages" are defined herein to include still video frame images or a multimedia short script for interpretation by a local process such as a typical page of HTML data as practiced by conventional web browsers. Thus the interactive page may show cursor movement or flashing or revolving images under local process control. An interactive page is typically sent intermittently from the frame server. It does not require the frame server to continually send video information multiple times a second.

A cable television system comprises a headend and distribution plant. The cable distribution plant includes a cable distribution network having bridger amplifiers, feeders, feeder amplifiers, and cable drops serving homes.

Figure 1B:
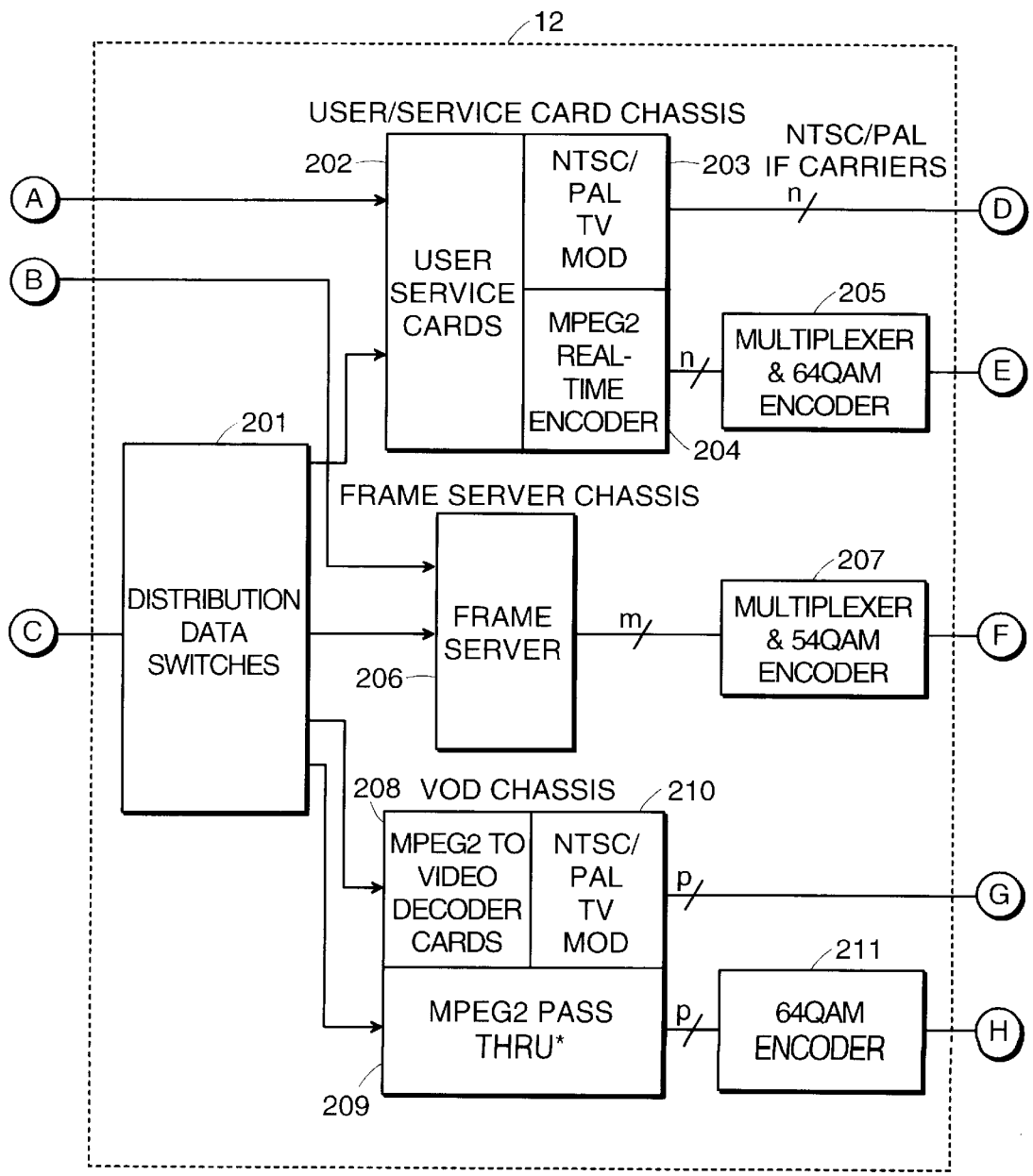
FIG. 1 is a block diagram of a headend for an embodiment of the present invention.
Figure 1C:
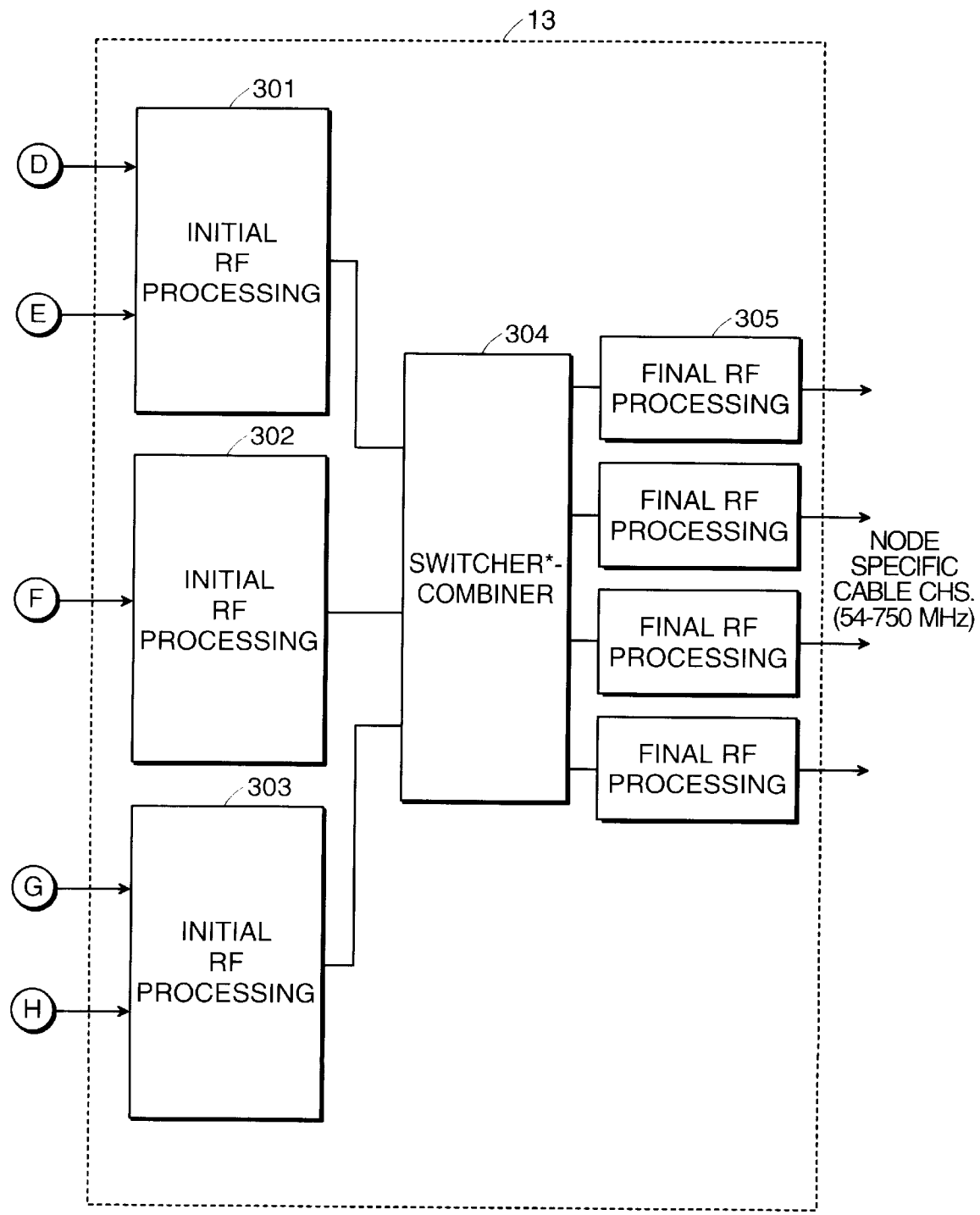

Referring now to FIG. 1, a headend is illustrated for providing interactive services. The headend includes back end 11, front end 12, and switching output RF hub 13. Data communication from subscribers is delivered thru a return data path to the back end 11 of the headend. One alternative return path is through telephone lines to telephone return path processing block 101. Another alternative return path is through a reserved frequency band throughout the cable network. For example, the 5–40 MHZ band may be reserved for data communication from subscribers to the headend. Cable return path processing block 102 is in communication with such signals provided over a cable return path. Telephone return path processing 101 and cable return path processing 102 are connected through return path switches 103 with user service cards 202 and frame server 206. The user service cards 202 each contain a processor that acts as an interactive controller which is individually assignable to a requesting subscriber on a demand basis. The interactive controller receives the data from its assigned subscriber and produces the information to be delivered to the subscriber in a television signal. The frame server 206 is one or more processors which interface with a plurality of subscribers. Processes running on the frame server 206 may be individually assigned to subscribers or may handle interactions with a plurality of requesting subscribers. Each interactive process on the frame server 206 responds to data from a subscriber and produces the information to be delivered to the subscriber in the form of a television signal.

The back end 11 further provides information sources to the front end 12. A network interface 104 is in communication with an Internet service provider. Back end switches 105 are in communication with the network interface 104 and web and application server CPU's 106 as well as system management CPUs 113. Communications are completed with the front end 12 through back end switches 105 via distribution switches 201. Because the user service cards in a preferred embodiment are diskless and lack ROM with stored software necessary for bootup, server 106 may also provide booting-up for the interactive controllers Also, server 106 provides a web proxy server function so that information downloaded from a remote server on the Internet is quickly cached on server 106.

Distribution switches 201 provide communication signals and control signals to the user service cards 202, the frame server 206, MPEG to video decoder cards 208 and MPEG2 pass thru 209. MPEG and MPEG2 digital encoding schemes are referred to herein by example only. Those of ordinary skill in the art should readily recognize that the present invention may be practiced with other currently available and later developed schemes for delivering video information through digital signals. The user service cards may be dedicated to any of a variety of interactive services. For example, there may be Internet service cards for running web browser processes and other video game player cards for running video game processes. The MPEG-to-video decoder cards 208 and the MPEG2 pass thru 209 are for providing video to subscribers on demand.

NTSC/PAL TV modulator cards 203 provide analog television signals from the outputs of the user service cards 202. The television signals are in the form of NTSC or PAL IF (intermediate frequency) signals. NTSC/PAL TV modulator cards 210 are also provided for providing video on demand on analog signals. The analog signals from the user card chassis NTSC/PAL TV modulators 203 and the video on demand NTSCIPAL TV modulators 210 are provided to initial RF processing 301 and 303, respectively, in the switching output RF hub 13. The initial RF processing includes upconverting the NTSC/PAL IF carrier signals onto a frequency determined by the channel frequency assigned to the subscriber destination. Channel assignment and control of any adjustable upconverters is handled by system management CPUs 113 which are in communication with the switching output RF hub 13 through communication lines not shown. In a presently preferred embodiment, a user service card 202, an NTSCIPAL modulator 203 and an upconverter may all be packaged in a single module. The module as a whole would be assigned to a requesting subscriber.

MPEG2 real time encoders 204 provide digital television signals from the outputs of the user service cards 202. The frame server 206 includes an MPEG encoder to provide digital television signals as well. Videos may be stored in MPEG format and may therefor use pass thru 209 to directly provide digital television signals. The digital signals are combined into a composite 64QAM (quadrature amplitude modulation) signal before going to initial RF processing. The digital signals are multiplexed so that many different signals may be carried on a single analog carrier. Multiplexer and 64QAM encoder 205 receives signals from the user chassis' MPEG2 real time encoders 204. Multiplexer and 64QAM encoder 207 receives signals from the frame server 206. 64QAM encoder 211 handles the video signals from the video on demand chassis. Within switching output RF hub 13, initial RF processing 301, 302, 303 is performed in which there is one RF module per simultaneous user. The output of RF processing 301,302,303 is switched for delivery to the service area of each respective subscriber destination and all signals going to a particular service area are combined via switcher-combiner 304. The combined signals for each service area pass through a final RF processing 305.

Figure 2:
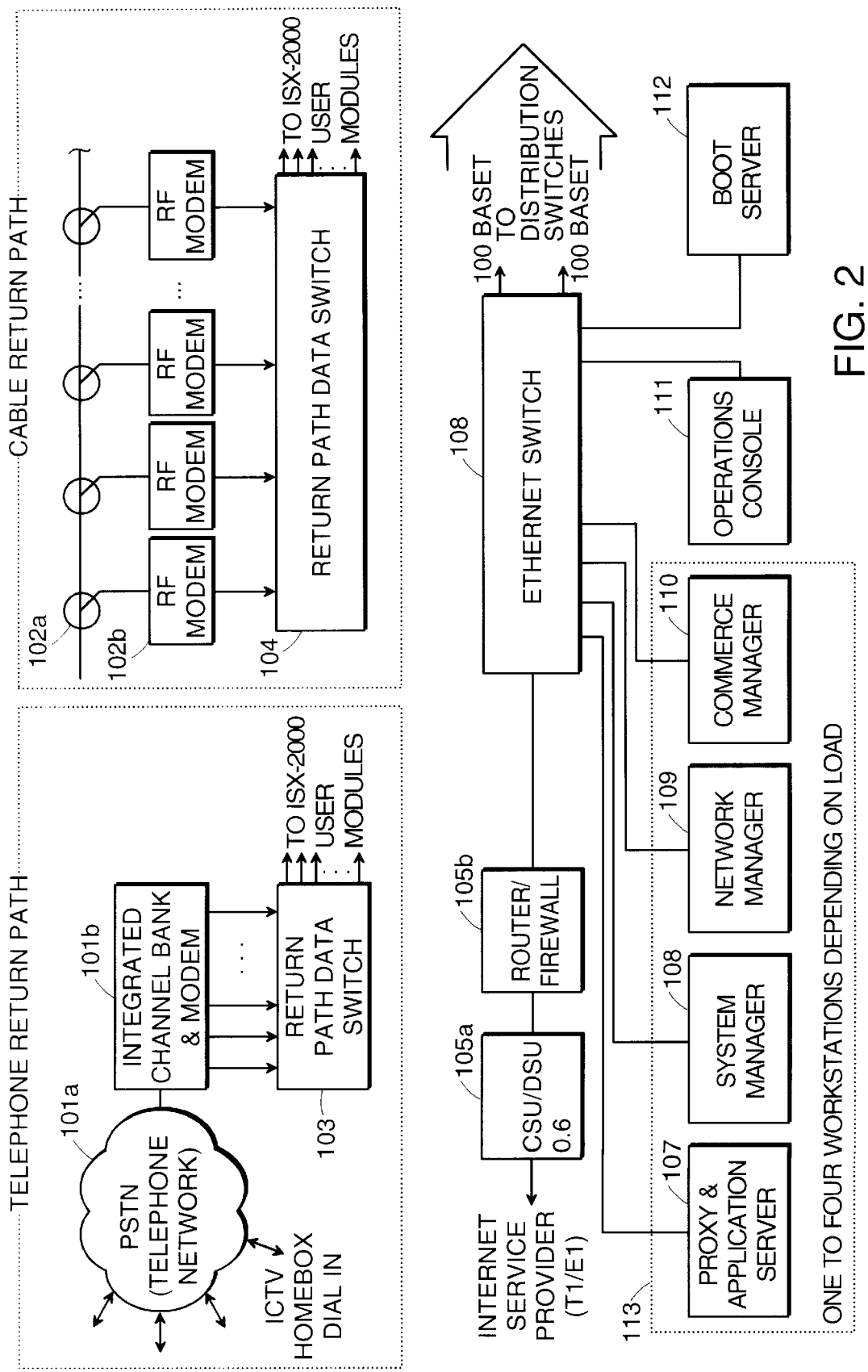
FIG. 2 is a block diagram of a back end for use in the headend of FIG. 1.

An embodiment of back end 11 is shown in more detail in FIG. 2. Cable return path processing 102 is provided by a bank of RF modems 102b. Splitters 102a extract cable signals for processing by the RF modems 102b. Telephone return path processing 101 is provided through the public service telephone network 101a to an integrated channel bank and modem 101b. Network interface 104 is provided by router firewall 105b and CSU/DSU (customer service unit/data service unit) 105a. Router firewall 105b is in communication with Ethernet switch 108. Also shown in FIG. 2 are web proxy and application server 107, system manager 108, network manager 109 and commerce manager 110 in communication with Ethernet switch 108. System manager 108 provides for the allocation of resources to permit interactive services with a user, as well as procedures for call set-up and tear down. Commerce manager 110 manages real-time transactions and converts billing to a batch format for handling by legacy systems. Also shown in FIG. 2 are operations console 111 and boot server 112 in communication with Ethernet switch 108.

Figure 3:
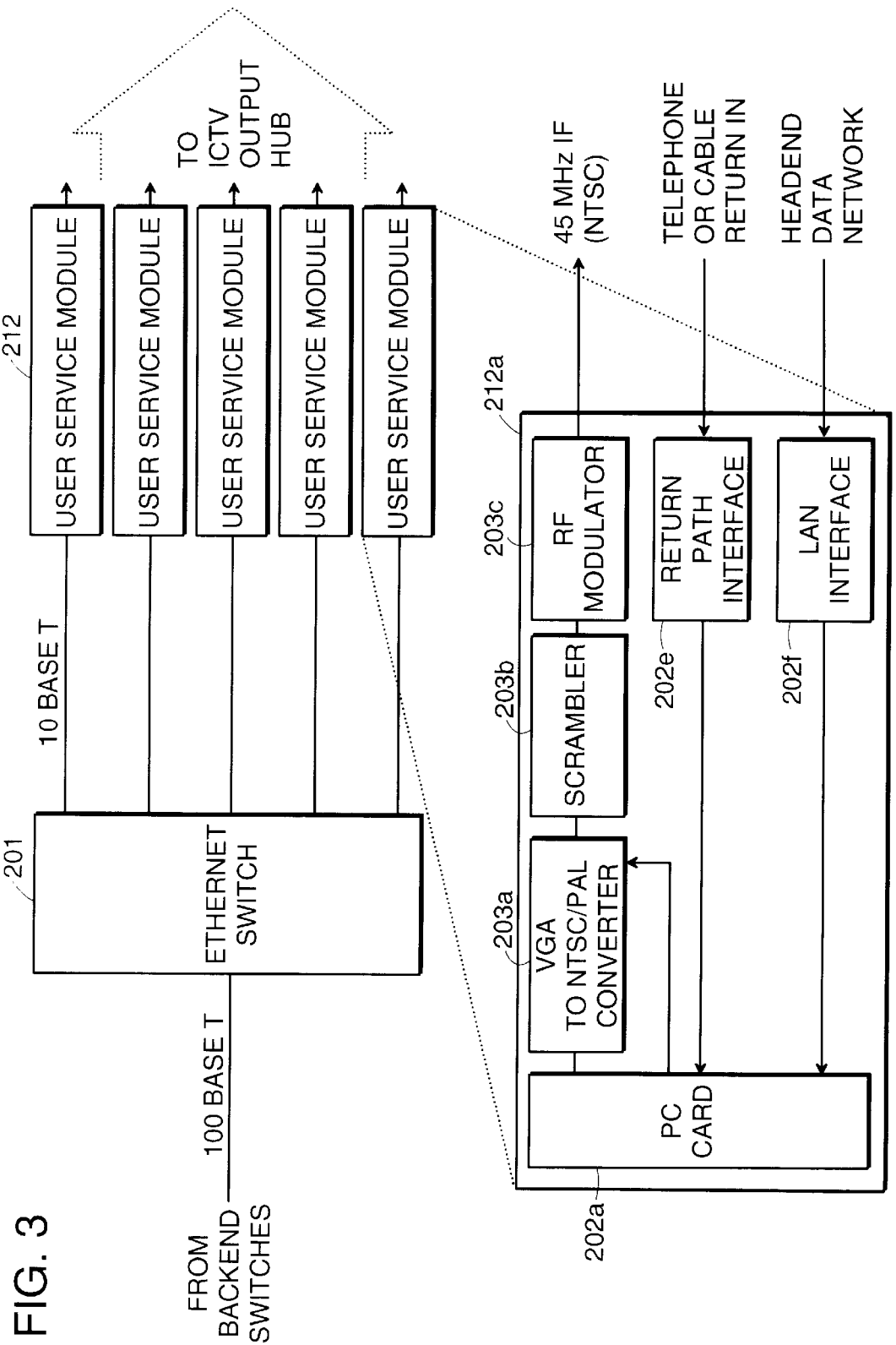
FIG. 3 is a block diagram of a front end for use in the headend of FIG. 1 with an exploded view of an analog user service module.
Figure 4:
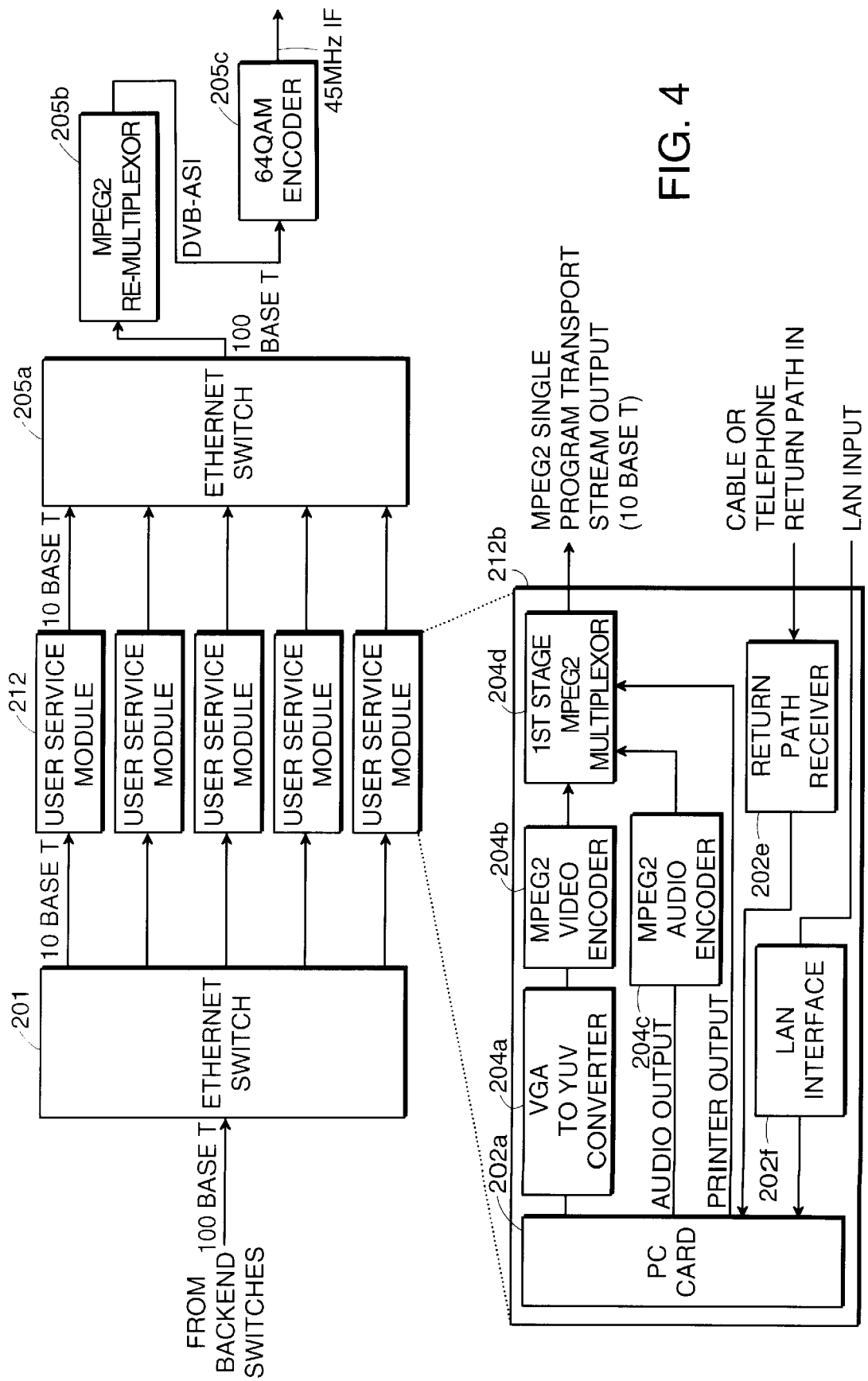
FIG. 4 is a block diagram of a front end for use in the headend of FIG. 1 with an exploded view of a digital user service module.

An embodiment of front end 12 is shown in FIGS. 3 and 4. The user service cards are preferably each housed in a single user service module 212. Ethernet switches 201 are connected to the user service modules 212. The composition of the user service modules depend on whether they are to be used for analog or digital video signal processing. Arrangement of a preferred analog user service control module 212a is illustrated in FIG. 3. A return path interface 202e receives data signals from an assigned subscriber. A LAN interface 202f enables data communications between the user service card and the headend network accessed through the distribution data switches 201. This gives the user service card 202a access to various information sources and to the system management CPUs 113. The interactive controller is found preferably in a PC card 202a which is a personal computer on a single board. The NTSC/PAL TV modulator 203 includes a VGA to NTSCIPAL converter 203a, a scrambler 203b and an RF modulator 203c. The scrambler 203b can be a complete conventional scrambler providing in addition to a scrambled television signal output, a signal authorization for data transmission to the assigned subscriber to allow descrambling at the subscriber's set top. Alternatively and preferably, the scrambler 203b is a simplified scrambling unit that performs sync suppression to scramble the signal and is provided with a conditional access code (tag) for insertion into the scrambled signal. In such a system, a separate scrambler including an encrypter, an encoder and an access controller is provided in the front end 11 for each channel frequency. The access controller sends the signal authorization to each subscriber assigned to the channel frequency in any of the service areas. The signal authorization will typically include a key for decrypting the conditional access code. The encrypter encrypts the conditional access code. The encoder places the conditional access code into a scrambled reference video signal. An extractor in the separate scrambler for the given channel frequency removes the conditional access code from the reference and communicates it to each interactive control module active at the given channel frequency. The interactive control module provides a path for the conditional access code into the video scrambler 203b where it is inserted into the scrambled signal. The conditional access code may be inserted into the vertical blanking interval (VBI) or the audio subcarrier depending upon the desired system design. This scrambling system is described in copending U.S. Provisional application No. 60/067,990 in a portion entitled "Distributed Scrambling Method and System". The full disclosure of the copending provisional patent application has been incorporated by reference herein. The RF modulator 203c may include an IF signal that is modulated by the scrambled television signal to produce for example a 45MHz IF carrier for the scrambled television signal. It has also been found convenient to include the initial RF processing 301 in the analog user service control module 212a. This involves including an RF upconverter for receiving the modulated IF carrier and raising the carrier to a frequency determined by the assigned channel frequency.

FIG. 4 illustrates a digital user service control module 212b. It can be seen that the digital user service control module 212b is similar to the analog user service control module 212a as for the data input interfaces and the use of a PC card to act as the interactive controller. In the digital control module 212b, the information signal from the PC card 202a is provided to a VGA to YUV converter 204a. The digital YUV output is encoded. The presently preferred encoder is an MPEG2 video encoder 204b and an associated MPEG2 audio encoder 204c. The encoded digital television signal is input to a first stage of an MPEG2 multiplexer 204d. To the extent the cable system is also used to handle print requests from subscribers, printer output can be sent from the PC card 202a to the first stage of the MPEG2 multiplexer. The printer output would ultimately be directed through the cable system to a settop and a printer connected to the settop. All outputs from the first stage MPEG2 multiplexers 204d are passed to the multiplexer and 64QAM encoder 205. This includes Ethernet Switch 205a, MPEG2 Re-Multiplexer 205b and 64QAM encoder 205c. The 64QAM encoder 205c produces a 45MHz IF signal which can then be upconverted in initial RF processing 301.

In accordance with an embodiment of the present invention, a frame server 206 is advantageously included in the headend. The frame server 206 is one or more computers for running numerous processes, each interacting with one or more assigned subscribers. Typically, it is expected that the frame server would be used for providing primarily interactive pages. The frame server will typically provide initial service to a requesting subscriber, for example, for logging on and establishing initial service. The frame server can also be effectively used to deliver email messages, informational messages such as sports scores, transit schedules, weather, stock prices and other still frame oriented content. Other services can include Internet web browsing, catalog shopping, and electronic program guides. The inclusion of a frame server significantly reduces user demand for user service cards and thus holds down the overall cost of headend equipment. Rather than requiring a user service card for every subscriber that activates the interactive mode, the frame server allows many subscribers to receive interactive service without connection to a user service card. Indeed, the frame server is intended to provide an application source that is always available to respond to user interactions. Thus the system does not block but can always respond to an arbitrarily larger number of users albeit one frame at a time.

A subscriber interacts with a particular application within the frame server environment. The resulting outputs from the application are captured one display frame at a time and converted to the MPEG2 or other suitable format. After conversion, the frame is transmitted to the user for decoding and display on the user's television set. The frame server uses one digital channel on a cable television or other broadband system. All subscribers accessing the frame server connect to the common channel. A frame of video representing the output of the software application with which the subscriber is interacting is uniquely addressed to that subscriber and transmitted over the common channel, much as all packet switched networks operate. Only the digital settop terminal to which the frame of video is addressed will decode the frame. It is expected that a subscriber interacting with a frame server application will receive requested interactive pages in less than two seconds from the subscriber's request.

Referring now to FIG. 5, the frame server 206 will be described in greater detail. The frame server system will typically operate as a collection of individual software processes that run on a single computer for small system use. The frame server can be scaled to run on a networked cluster of computers acting in concert. The frame server 206 includes a plurality of information servers. These may include a web server 206b, a mail server 206c, a news server 206d and a message server 206e. Each information server provides its own particular class of information. Locally generated messages are created by the message page generator 206f which provides those pages to the message server 206e. A cluster of message servers assist in the generation of pages of information and cover various message types including in the presently preferred embodiment a customer service message server 206g, a help and error message server 206g' and a third-party message server 206g". The third-party message server encompasses such content as local advertiser messages.

Regardless of server source, the message pages (video frames) are presented by the various respective servers to the user web browser 206h. All messages are created using HTML protocol so that regardless of source, the information is rendered via a web browser process 206h. The subscriber interacts with a web browser process via a return path processor 206q and request scheduler 206r. The return path processor receives user keyboard and pointer (mouse) commands from subscribers via the return path switch 103. The received user commands are processed by the return path processor 206q and passed to the request scheduler 206r for routing to the web browser process 206h handling a given user. The web browser establishes a state machine that tracks the user's inputs and generates requests to the appropriate server source.

Each active web browser process 206h renders an image in RAM from HTML source received from a particular server. The rendered output is then passed to an RGB to YUV display driver 206j which converts the program generated display information from the standard RGB format to YUV which is the input format used by MPEG2 compression systems. This YUV rendered display from is stored in a user virtual display memory 206k. A multiplexer, referred to herein as a user encoder queue manager 206m, sequences the multiple user display pages through a FIFO to queue up for the MPEG2 I-frame encoder 206n for MPEG compression. The compressed signals are eventually transmitted to the respective subscriber via MPEG frame addressing 206p which provides addressing and system information appropriate to the digital settop in use by the system. The resulting data stream, including various user display frames, is routed into the switching output RF hub for distribution to the requesting subscribers.

Figure 6:
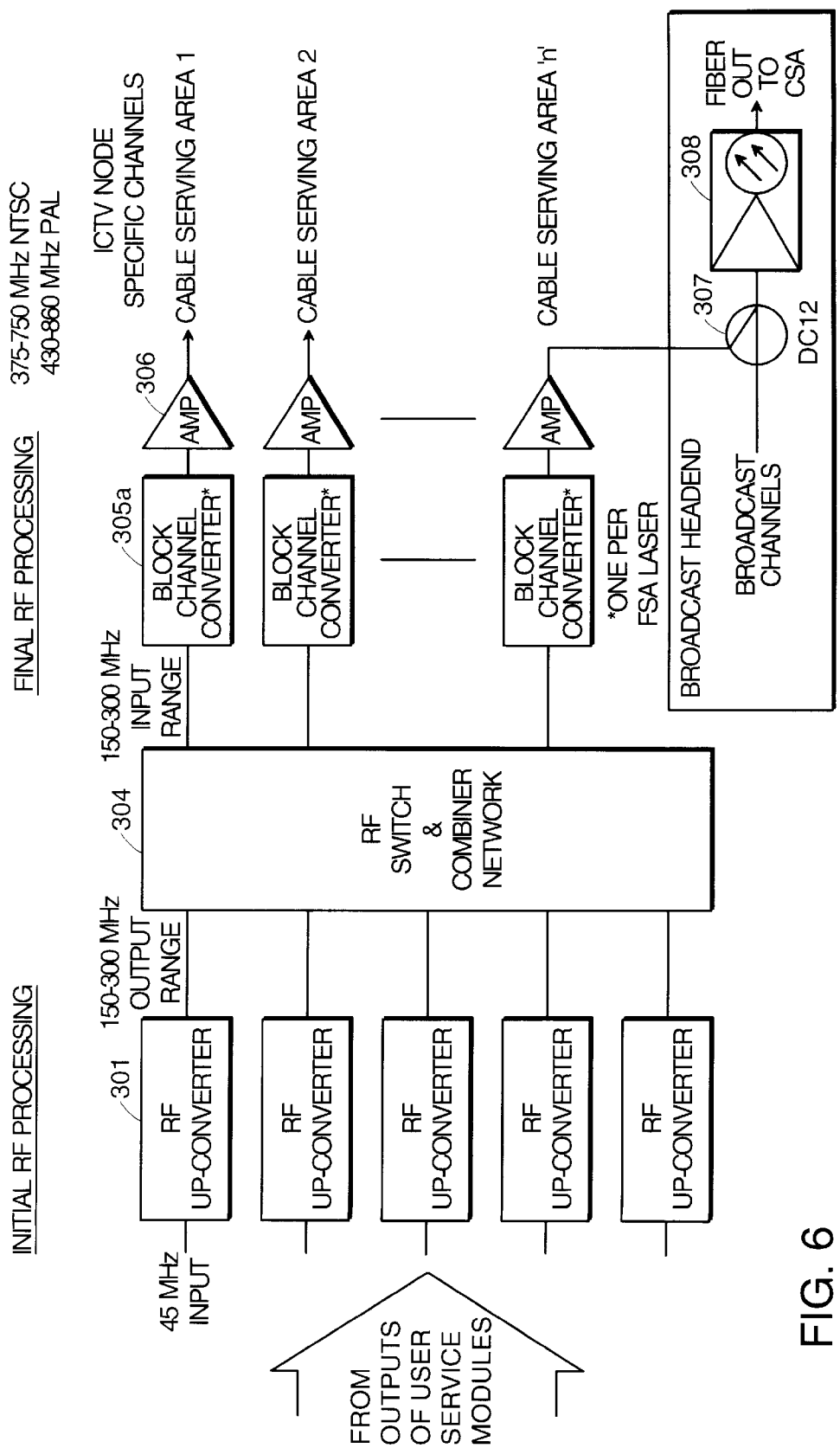
FIG. 6 is a block diagram of a switching output RF hub for use with the headend of FIG. 1.

An embodiment of switching output RF hub 13 is shown in FIG. 6. Initial RF processing is performed by RF up-converters 301, converting 45 MHZ input to an output in the range of 150 to 300 MHZ. The upconverters are preferably capable of modulating a carrier that is tunable under control of the system management CPUs 113, so that any given upconverter may be configured to best handle demands placed on the system. RF switch and combiner network 304 provides the upconverted signals to final RF processing 305, which in FIG. 6 are indicated by block channel converters 305a and amplifiers 306. There is one block channel converter 305a for each service area. The interactive signals for delivery to a service area are combined with broadcast channels that are identically transmitted to all service areas. FIG. 6 illustrates this for one of the service areas where combiner 307 is shown. An optical transmitter 308 is used for sending the combined signals out over optical fiber.

Figure 7:
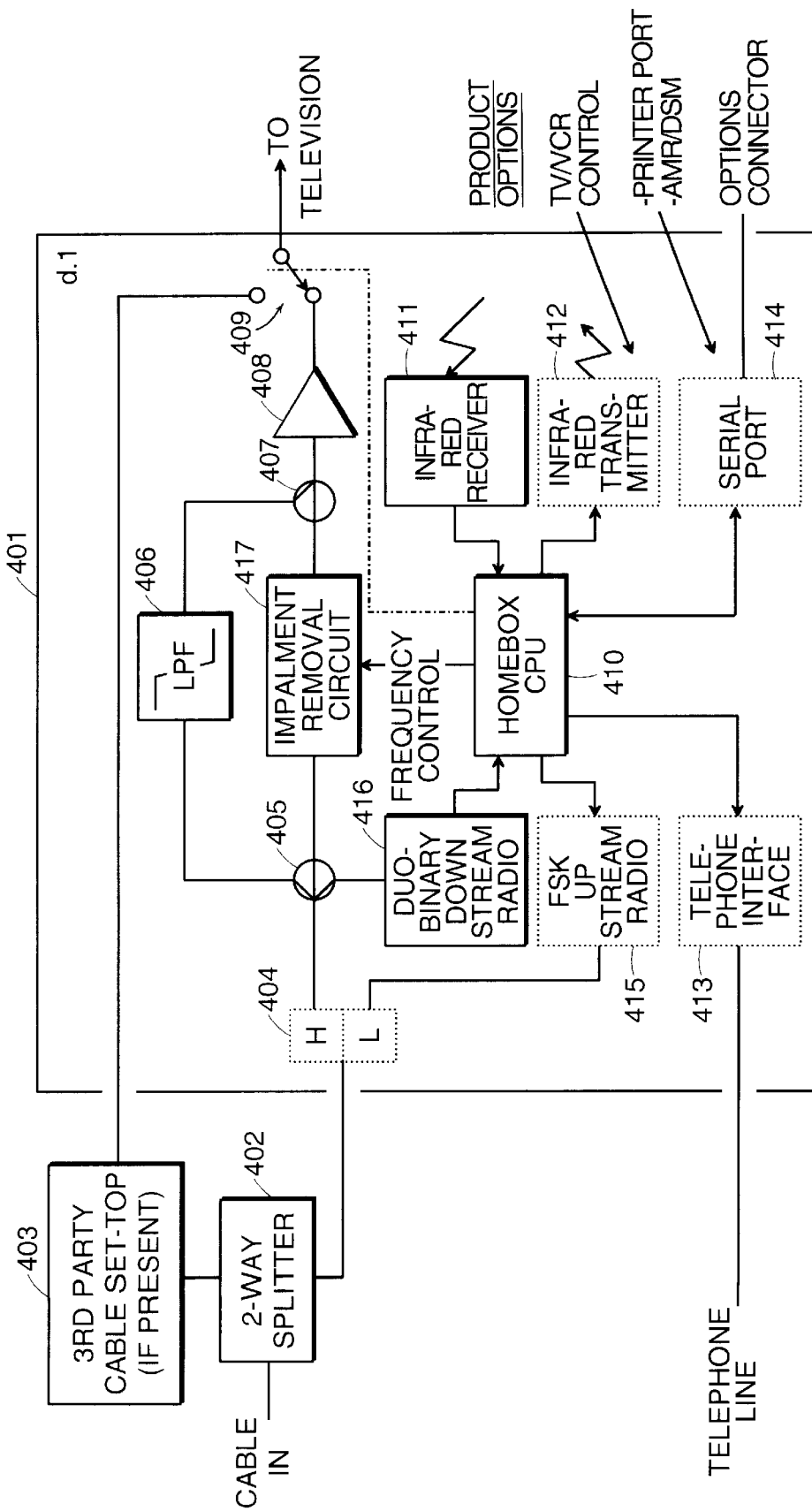
FIG. 7 is a block diagram of a home interface controller for use in connection with the headend of FIG. 1.

Each subscriber of the system is equipped with a home interface controller 401 through which all interaction is conducted with the headend. Preferably, the home interface controller both receives the television signals from the cable and conducts data communication. However, the data communications could be handled by a separate box connected to a phone line, if desired. A presently preferred home interface controller 401 is shown in FIG. 7. A cable carrying the television signals from the subscriber's service area is connected to a two-way splitter 402 which may also be connected to a cable set-top 403 provided by a third party. A diplex filter and combiner 404 provide a first frequency path to splitter 405 and a second frequency path to FSK (frequency shift-key) radio 415, where the first frequency path occupies a higher spectral region than the second frequency path. The first frequency path provides a downstream path for signals going from front end 12 to the user of the home interface controller whereas the second frequency path provides an upstream path for signals going from the user to front end 12. An alternate upstream path may be provided through telephone lines via a telephone interface 413.

Splitter 405 provides a signal path to low pass filter 406 and an impairment removal circuit 417. The outputs of the low pass filter 406 and the impairment removal circuit 417 are re-combined at combiner 407, then amplified by amplifier 408. Switch 409 allows the user of the home interface controller 401 to switch between the signal output of amplifier 408 and the output of the third party set-top 403 (if present). Switch 409 may also be under control of home box CPU 410.

Home box CPU 410 provides control and communication signals to impairment removal circuit 417, FSK upstream radio 415, telephone interface 413, serial port 414 and infrared transmitter 412. FSK upstream radio 415 is a modulator for providing a data communication link through a low frequency band on the cable between the home interface controller 401 and front end 12. Collectively, the upstream radio 415 and downstream radio 416 constitute the transmitter and receiver, respectively, of a data transceiver. In addition to or instead of the FSK upstream radio 415, telephone interface 413 can be used to provide communication over ordinary telephone lines to the front end 12. Infrared transmitter 412 may be used to communicate with the cable set-top 403 or the television. For example, when interactive mode is requested, the infrared transmitter can transmit the assigned frequency to the set-top or television tuning the appropriate appliance to receive the interactive television display. The frequency is learned by the CPU 410 through the downstream radio in communications from the headend. Infrared receiver 411 receives commands from a subscriber selection device. The subscriber selection device may be a typical television remote control or may include a keyboard, a mouse or other input device. The subscriber will have a channel selection input available for selecting a program on at least one of the available selection devices.

A serial port 414 may be advantageously included on the home interface controller to provide communication with a printer for hard copy printouts. The serial port enables the subscriber to connect a printer to the home interface controller. When a subscriber is using the interactive system to browse the Internet, read email, review advertisements or other still frame viewing, a print command can be used to obtain a printout of information. When the print command is received by an assigned interactive controller at the headend such as in digital control module 212b, the output to the subscriber can be changed to a printer output which the home interface controller receives and passes along through the serial port to the attached printer.

It is contemplated that households having printers, generally have them attached to their home computer. Such persons may be unwilling to purchase an additional printer for their interactive television system or to move their printer from the computer to the television. The interactive system described herein may be used to create a virtual local area network. An additional home interface controller may be installed in the home for connection to the printer. The television cable into the home may be connected to this home interface controller in addition to connection with the home interface controller of the television. A subscriber operating in interactive mode and viewing a television screen may activate a print command by clicking a mouse with a cursor on the screen over a print icon, by simply keying in a print command or other input method. The application at the headend communicating with the subscriber will ask the subscriber to which home interface controller should the print output be sent. The destination for print output can be preentered as a default, set up early in an interactive session or entered when printing is desired. When the print command and destination are received at the headend, the printer output from the application can be addressed to the destination home interface controller instead of the requesting home interface controller. When printing is complete, the application can return to interacting with its assigned requesting home interface controller. In accordance with this method of operation, the destination home interface controller can be anywhere on the cable distribution network. Thus a user can cause a print out at an office printer, a relative's printer or indeed any printer the user can identify. For the user at home, printing through a printer at home it may seem that the print command is causing a transfer of the screen being viewed on television directly to the printer in another room. In reality, the print command will travel up to the headend causing the headend to deliver the print output down through the cable to the designated home interface controller with an attached printer. The home interface controller will need to always be listening to a data communication link or to the frame server common channel so as to recognize and receive information addressed to itself.

Figure 8A:
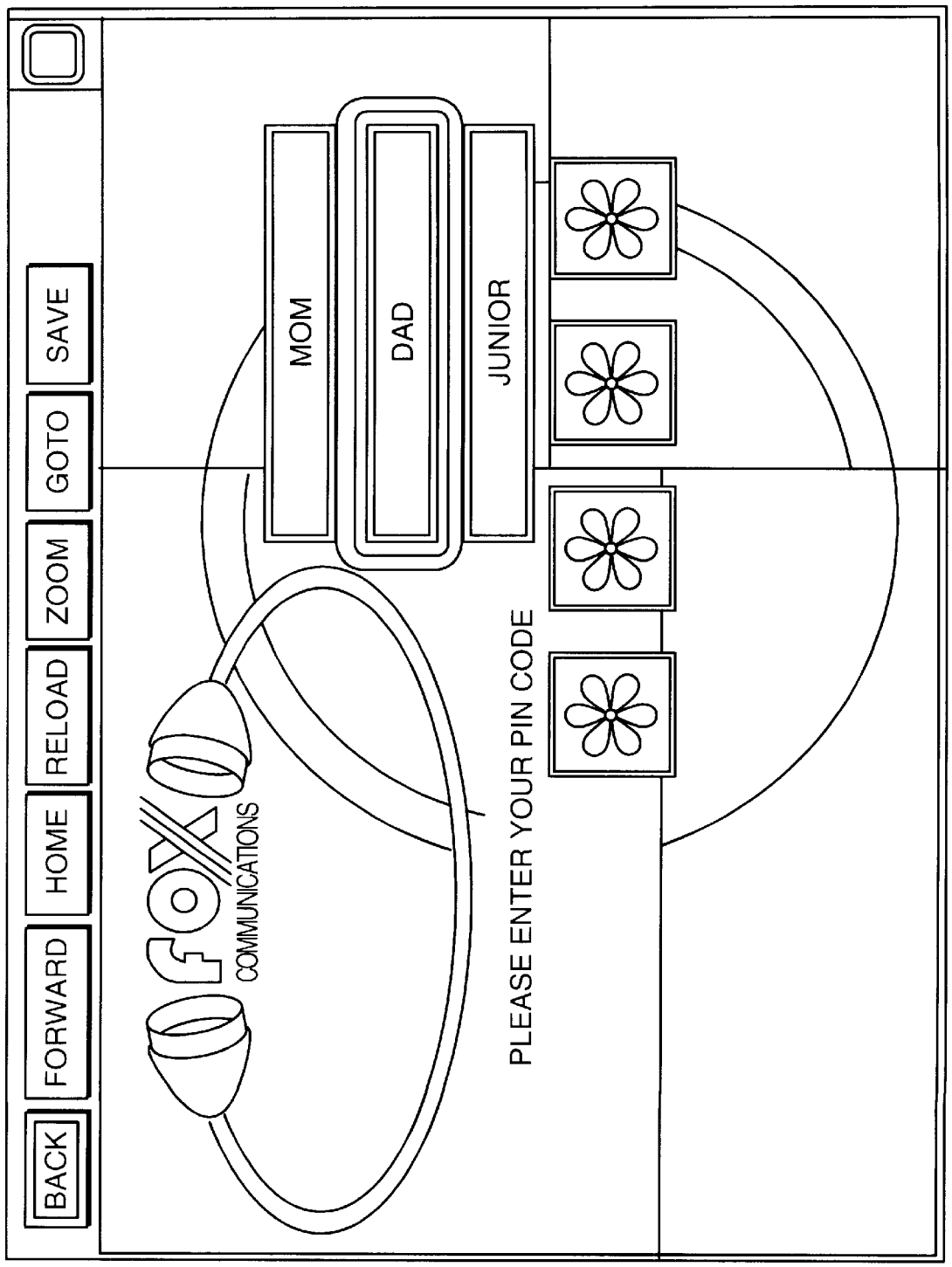
FIGS. 8A–8F illustrate examples of subscriber television screen displays during an interactive session.
Figure 8B:
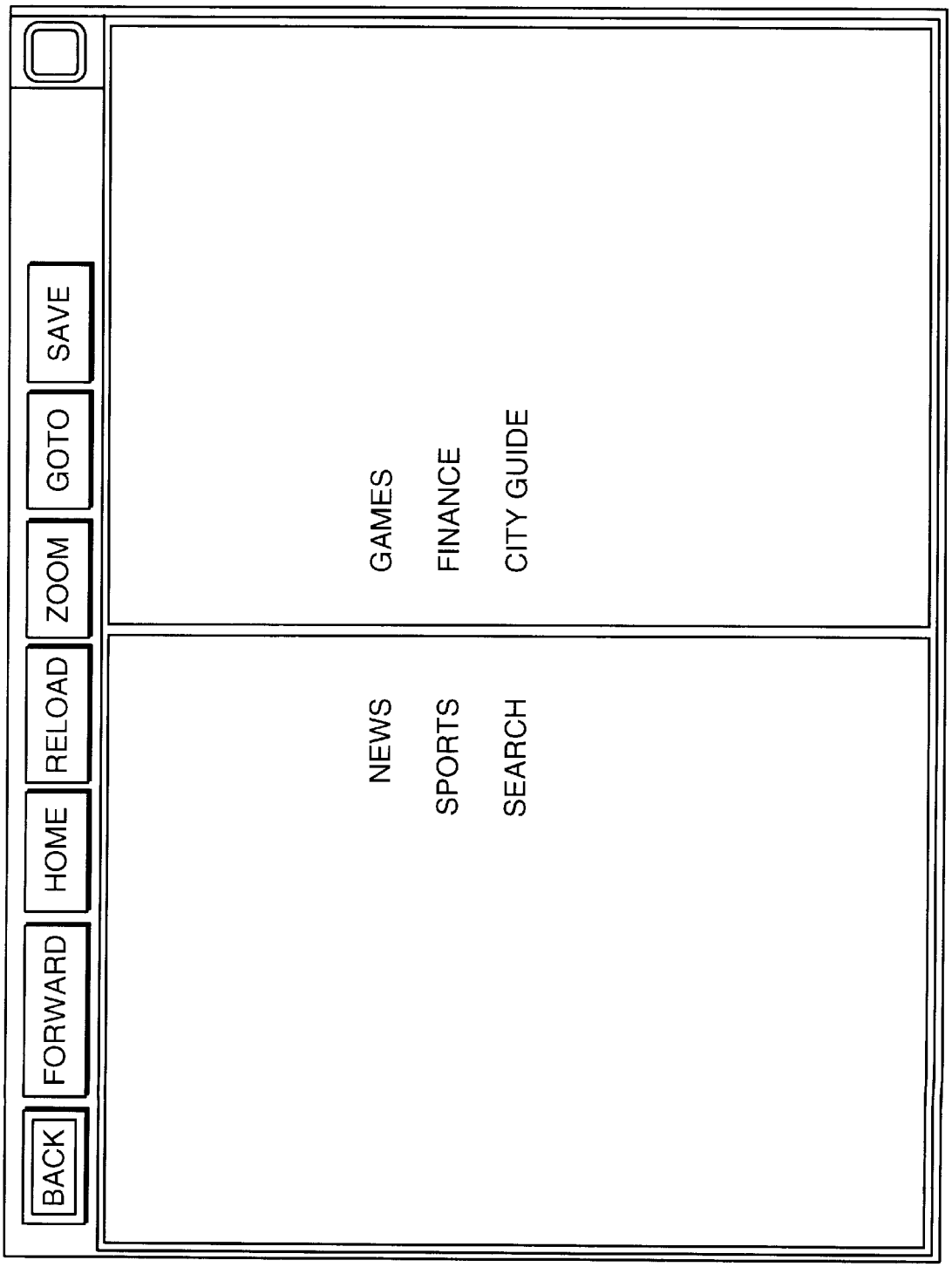
Figure 8C:
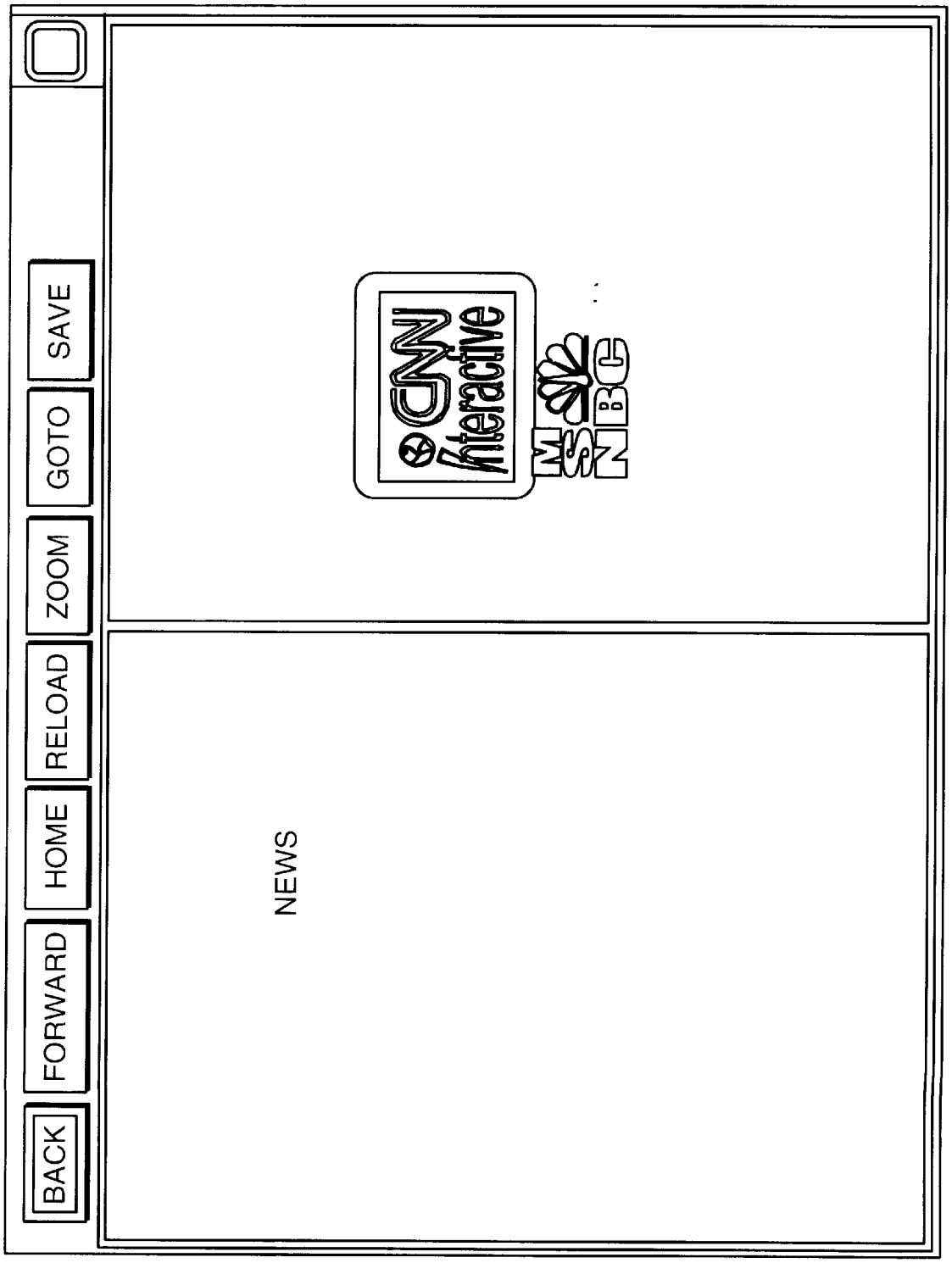
Figure 8D:
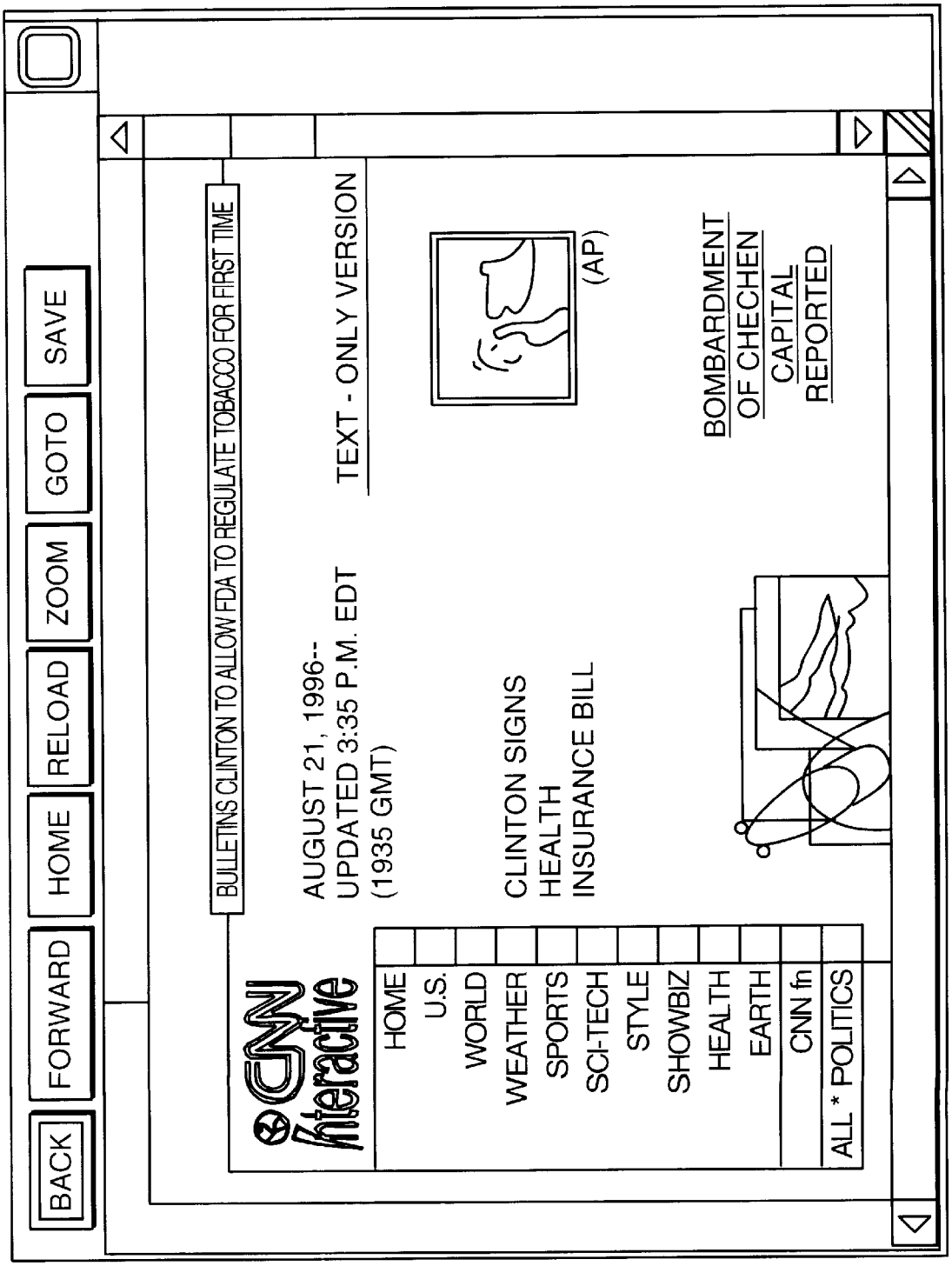
Figure 8E:
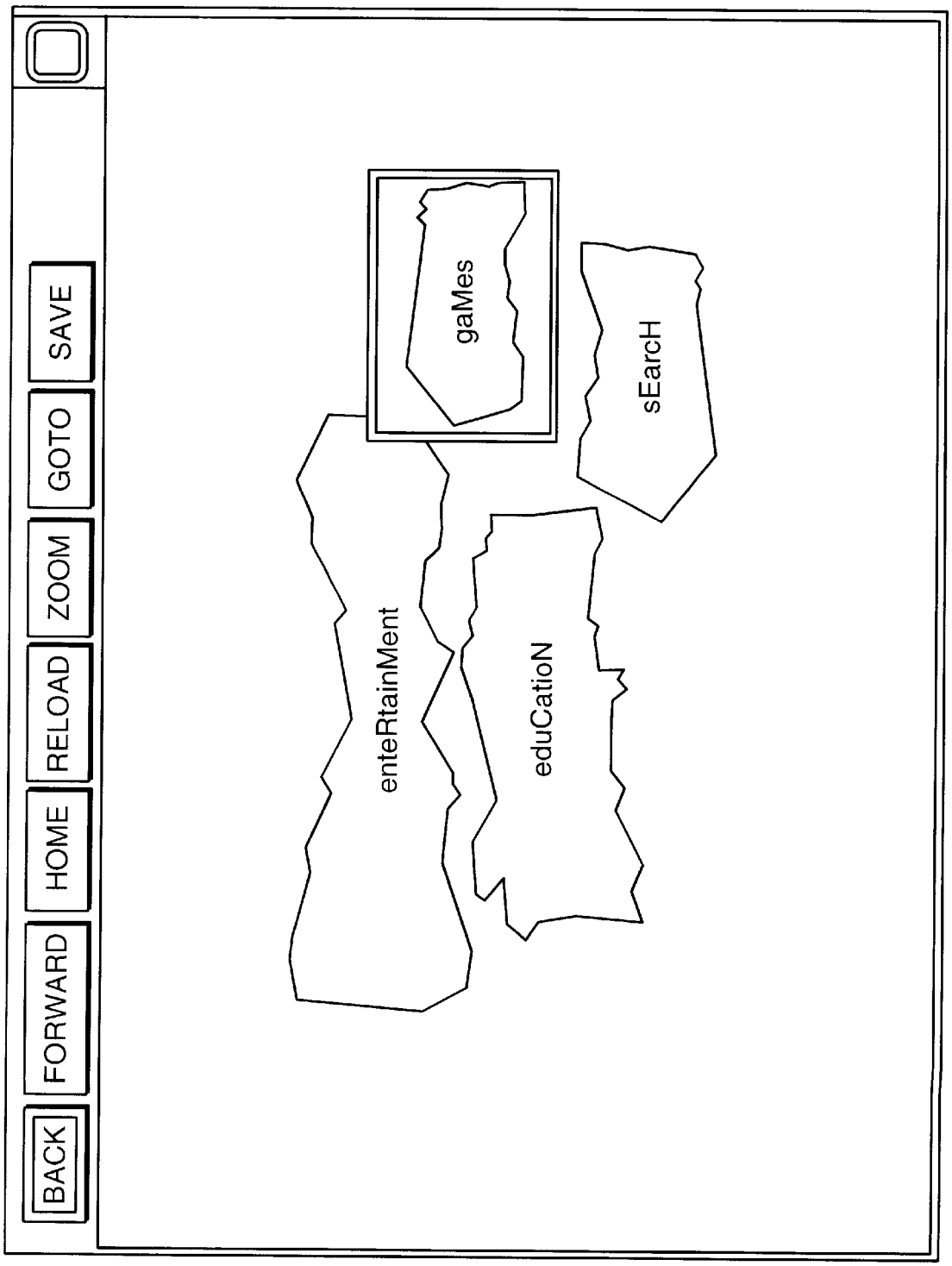
Figure 8F:
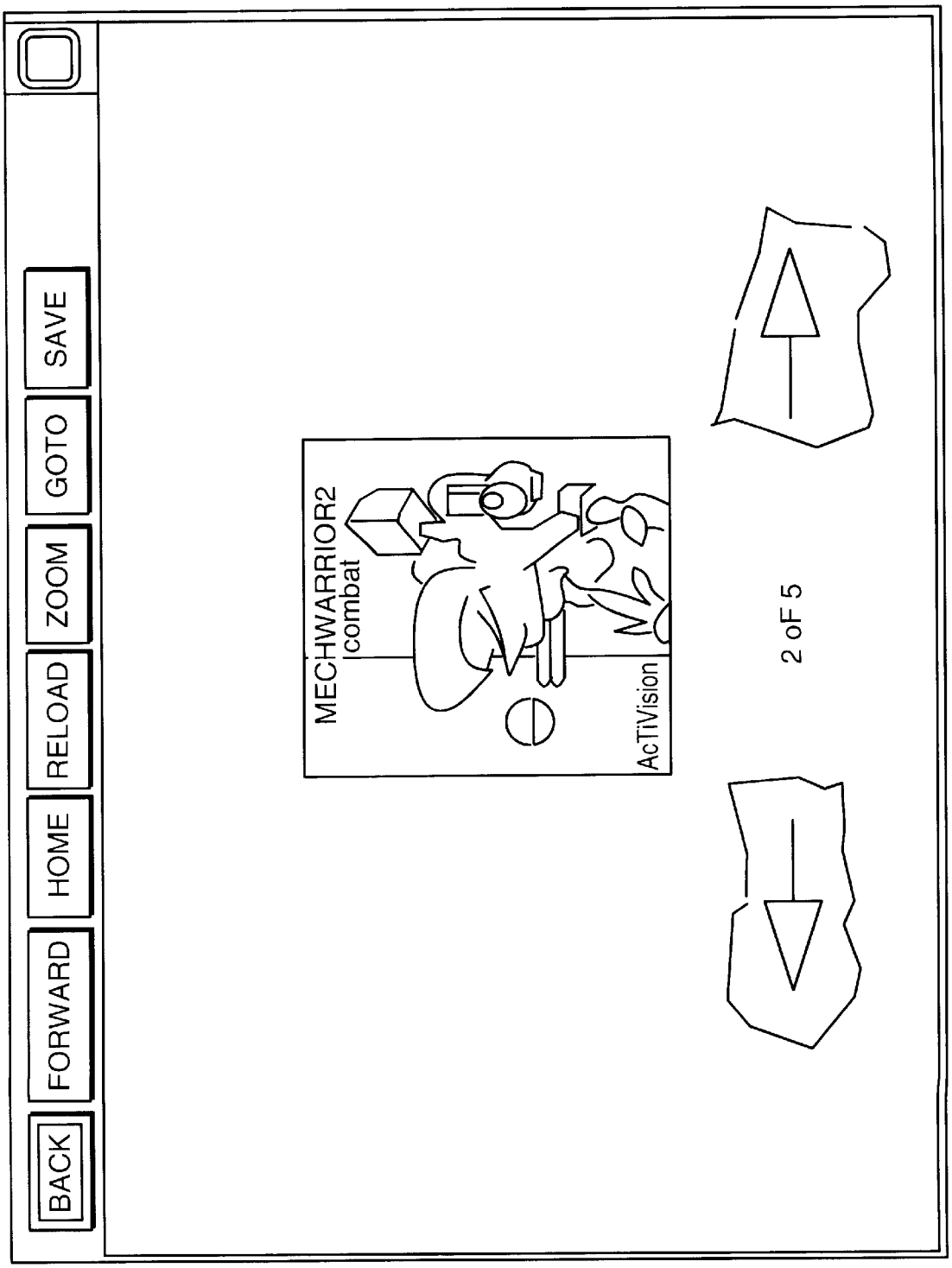

When a user of the home interface controller requests an interactive service from head end 12, such as Internet service or a video game, an appropriate frame server application or user service module is placed in use for providing the service to the user. The user selects the desired service by using the subscriber selection device in conjunction with the home interface controller. Examples of screen displays available to the user for selection of a service are illustrated in FIGS. 8A–8F. FIG. 8A shows a beginning display, in which front end 12 requests appropriate information from the user, including a PIN code number. In this way, for example, children may be blocked from requesting unsuitable video content. Once the back end 11 identifies the user (this will be discussed in more detail later), various options are available, as shown in FIG. 8B. FIG. 8C shows a screen in which the "news" option of FIG. 8B has been chosen. In FIG. 8C, once the user has decided to choose a news program, the user may decide to choose CNN or MSNBC. FIG. 8D shows the screen when the user has selected the CNN option of FIG. 8C. FIG. 8E is similar to FIG. 8B, except that this screen appears when the "Junior" button and appropriate PIN code is entered in FIG. 8A. FIG. 8E shows the screen that results when the "gaMes" button in FIG. 8E is entered. It should be noted that the interaction here is via an Internet-type browser, which permits not merely surfing the Internet, but actually selecting different information services using hyperlinks.

Figure 9:
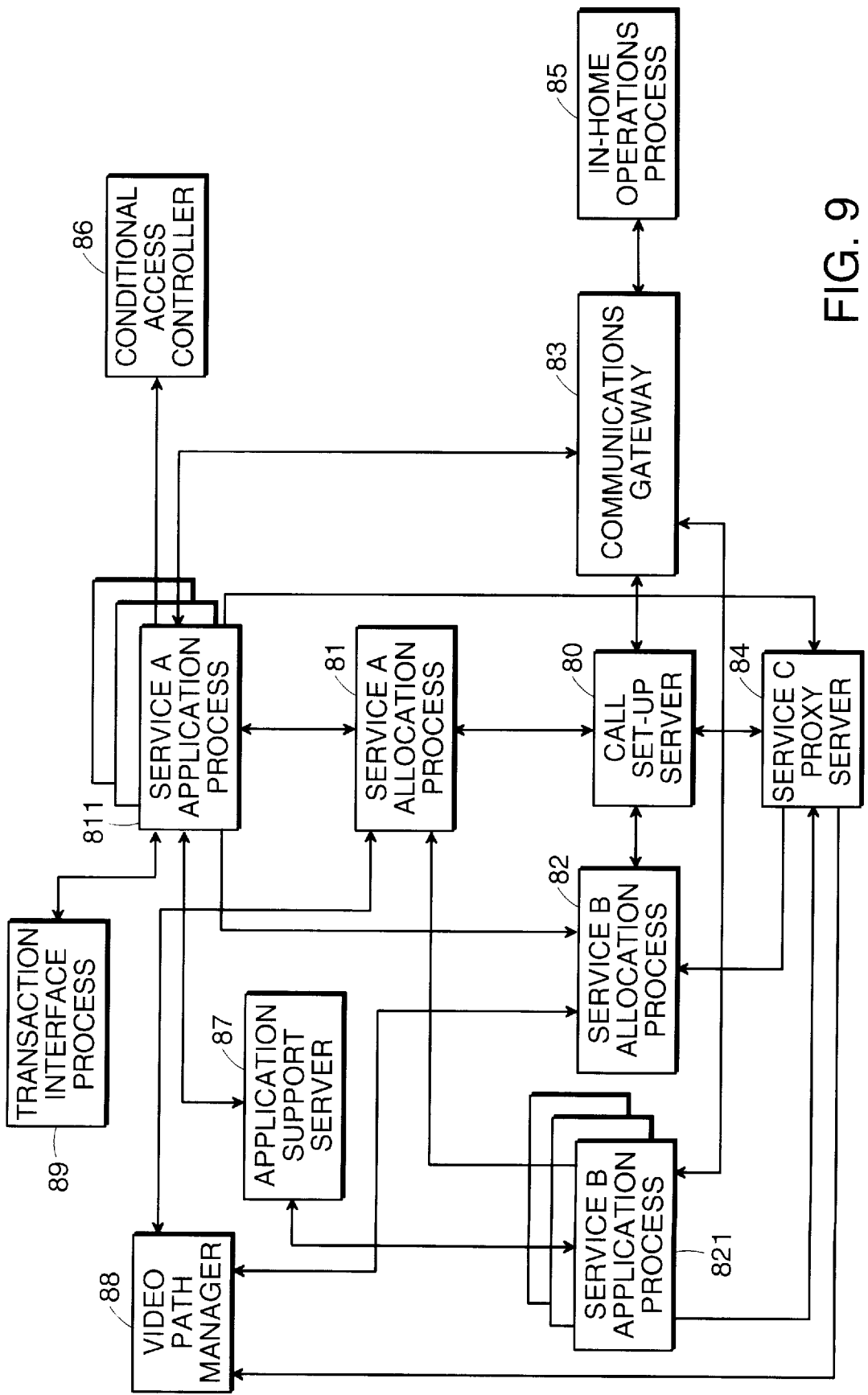
FIG. 9 illustrates a system diagram of a system manager for use in the headend of FIG. 1.

FIG. 9 illustrates a system diagram for system manager 108, indicating the two functions of (1) call set-up and tear down and (2) resource allocation with the interactive TV system of FIG. 1. Call set-up is the process of causing the assignment of a television information signal path to the home interface controller for interactive service, and resource allocation is the process of assigning appropriate user service cards and virtual circuits within the switching system in the back end.

Call set-up is initiated by a small program in the home interface controller which keeps track of the channel the user is watching. The channels are broken into bands where, for instance, channels 2 through 73 are assigned regular TV programming both off-air TV channels as well as cable channels such as MTV, HBO, CNN, etc. The band above this broadcast band uses channels 74 to 79, for instance, for interactive services where a user is assigned one of these channels only during the duration of that user's interaction with the interactive TV system (i.e. - while looking up a restaurant in the entertainment guide, or while watching a movie, etc.). A user may tune from a broadcast channel (e.g.—ch. 37 CNN) to an interactive service virtual channel, at which time the user will be provided with the screen displays of the type shown, for example, in FIGS. 8A through 8F. When the user selects interactive service, the small program in the home interface controller sends a signal to the system manager at the back end to initiate call set-up.

The system manager in back end 11 begins the call set-up process through a system manager subsystem called the call setup server (CSS) 80. The CSS 80 finds a free interactive element or selection element corresponding to the virtual channel number the user is trying to tune to. As an example, assume the user is interested in movie previews which are viewed through interacting with a user service card and a program run on service "A" application process 811. The CSS 80 will call a video path manager subroutine to check for an available television information channel within the band of television information signals allocated to provide interactive service to the neighborhood of the requesting user. The newly assigned television information signal of the requesting user and the user's network address is passed to a service allocation server (SAS) 81 associated with the application process.

Assuming a non-blocked call, the system management function has now passed from the CSS 80 sub-system to the SAS 81 (for this example). The CSS 80 is now out of the loop. The SAS 81 checks for a free resource, i.e., a processor for running a service application process. If one is available, control is passed to it along with the assigned television information signal and address of the calling user. The processor, in this example, is a user service PC card 202a. The service application process run by the PC card 202a sends a request to the application support server 87 for subscriber information to authenticate the user id for the neighborhood from which the signal is originating. The service application process also requests subscriber information from the application support server 87 customer database to check for paid-up service and/or access to service permission (e.g.—used to block children from viewing R rated movie previews, for one example). Upon success, the service application process directs the conditional access controller (CAC) 86 to send a descramble key code to the user's set-top converter to allow it to descramble the video signal that the service application process will be using. The service application process also communicates directly with the in-home operations process (IHOP) 85 running in the home interface controller CPU 410, informing the program of the assigned television information signal. A separate processor in the set-top receives the descrambling authorization keys and translates them.

The set-top IHOP 85, upon receiving the assigned channel, tunes the cable TV settop to the assigned channel. The user will see the output of the SAP 811 and can begin using the remote control to manipulate the program running on the SAP 811. The in-home operation process 85 transmits appropriate remote control commands addressed to the processor/process assigned to it. When the user tunes to a broadcast TV channel, the call take down process is initiated by the set-top system manager extension signaling the 811 that the user has tuned away, and, after a time-out period (for instance, five minutes), the 811 signals the call set-up server 80 to release the interactive virtual channel previously assigned. The virtual channel is logged back into the free channels list by the CSS 80. At the same time, the SAP 811 signals the SAS 81 that it is now a free resource and the SAS places the user service card that had provided the application process on its free card list.

The example above is the same for other kinds of user service cards for interactive multimedia, such as video game player cards, and MPEG-to-video decoder cards 208. A user service card can be used for a front end application such as movie previewing and purchasing. When the user picks a movie using a user service card, the user service card will then pass control of the user to a control program that manages movie playback and decompression (MPEG2 to NTSC). When the movie is over, the movie playback control program follows the same steps of call take down as the user service card did.

The above system management scheme can accommodate any number of diverse services in a fully distributed manner such that there are no bottlenecks in the system. This affords optimal performance in response to user requests. By distributing the processing of communications with home interface controllers throughout system management, a greater amount of processing can be conducted in less time with less expensive processing units.

System management may include separate service allocation servers 81 or 82 for each of the video on demand system, the digital user service cards and the analog user service cards. Moreover, there may be additional service allocation servers further dividing the user service cards into groups according to the type of interactive service provided. Thus, there may be a service allocation server for movies only, for games, and for catalogs. The service allocation servers act as intermediaries between the call set-up server and the video provider elements whether they be analog user service cards, digital user service cards, frame server web browser applications 206h or MPEG-to-video decoder cards 208. The service allocation servers provide distributed management. The call set-up server 80 can pass the call set-up to the appropriate service allocation server. As the service allocation server identifies a video provider element and completes the connection with the home interface controller, the call set up server can be attending to the next caller.

The communications gateway 83 acts as a translator between the IHOP 85 and the back end 11 LAN connecting the distributed processes of the system manager. The communications gateway 83 translates the IHOP address from an individual user into a global Internet Protocol (IP) address for addressing ethernet data packets within the back end LAN. IP is part of TCP/IP. Communications are directed from the communications gateway 83 to the application process directly. Once the service allocation server assigned to a home interface controller has put the home interface controller in communication with the requested application process, the communications can be handled directly. System management is also required to maintain administrative tasks such as billing. Each of the service application processes is in communication with a transaction interface process so that billing and credit and other financial matters can be taken care of.

Figure 10:
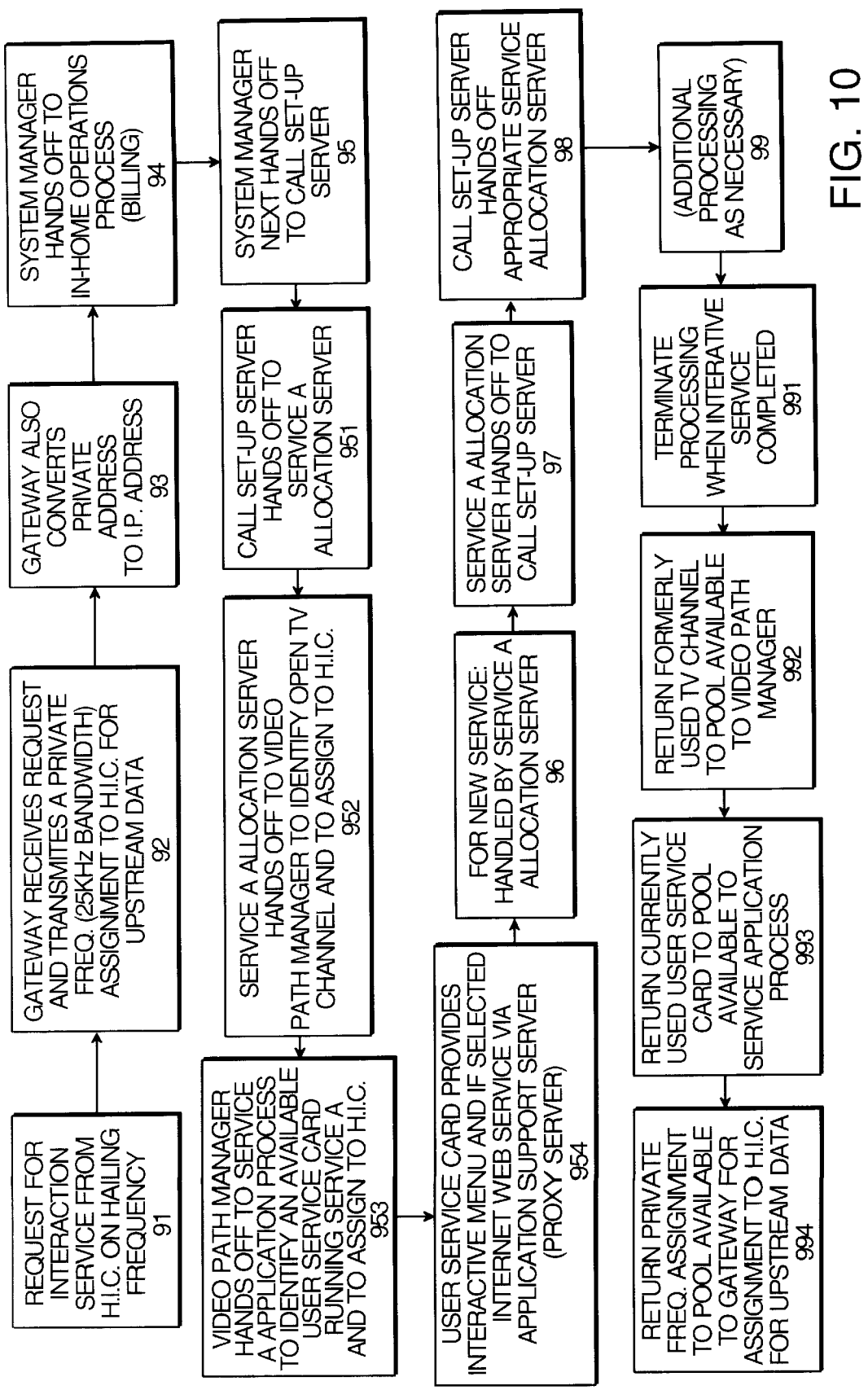
FIG. 10 is a flow diagram for a call set-up and tear down procedure for use by the system manager of FIG. 9.

FIG. 10 illustrates a flow diagram for a call set-up and tear down procedure as shown in FIG. 9. In FIG. 10, step 91 indicates that a request for an interactive service from a home interface controller is made on a hailing frequency. The hailing frequency need only occupy a relatively small bandwidth at a relatively low carrier frequency (compared to ordinary television signals). In step 92, the gateway receives the request from the user and transmits a private frequency (approximately 25 kHz bandwidth) assignment to the home interface controller to be used for upstream data. Instead of a private frequency, the gateway may transmit the frame server common channel or this channel may be a default initial channel without need for notification. In step 93, the gateway also converts the private address to an IP address, as discussed in relation to FIG. 9. In step 95, the system manager hands off to the call set-up server, and in step 951, the call set-up server hands off to the service A (for example) allocation server. In step 952, the service allocation server hands off to the video path manager to identify an open TV channel to assign to the home interface controller. In step 953, the video path manager hands off to service A application process to identify an available user service card to run service process A and to assign to the home interface controller requesting the requested service. In step 954, the assigned user service card provides an interactive menu and, if selected, Internet Web service is provided via an application support server (proxy server). Step 96 indicates that a newly requested service is handled by service A allocation server. If a new service is requested, then in step 97 the service A allocation server hands off to the call set-up server, and in step 98 the call set-up server hands off to the appropriate service allocation server. Step 99 indicates that additional processing maybe necessary, depending upon the requested service (as discussed in relation to FIG. 9). Application processing is terminated in step 991 when the interactive service is completed, whereupon in step 992 the assigned TV channel is returned to the pool of available channels to the video path manager. Also, upon completion of the interactive service, the assigned user service card is also made available to the pool of available service application processors. In step 994, the assigned frequency is returned to the pool of available frequency assignments so that the gateway can re-use the frequency for upstream data from another home interface controller.

Further details regarding system management and the use of service allocation servers therein can be found in copending U.S. application No. 08/987,405, filed Dec. 9, 1997, entitled "System Manager and Hypertext Control Interface for Interactive Cable Television System" and having the same assignee as the present application. The full disclosure of said copending patent application is hereby incorporated by reference herein.

Figure 11:
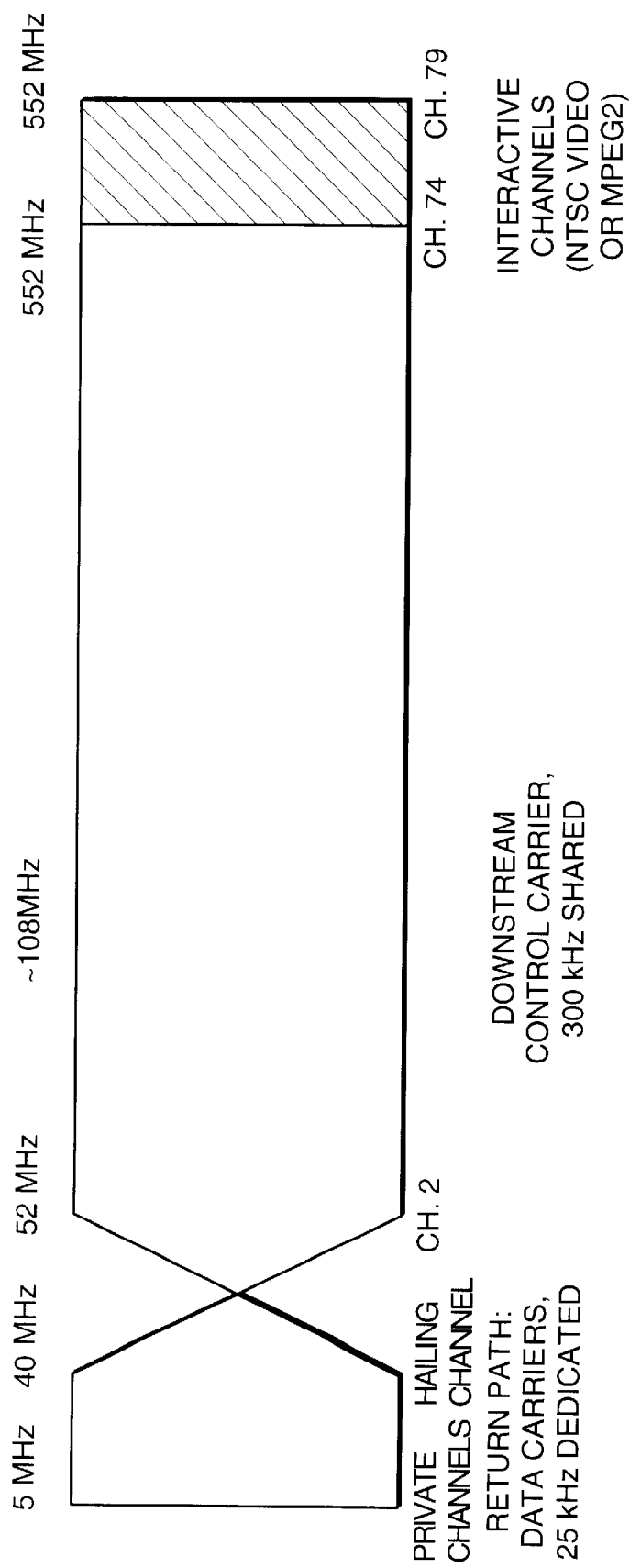
FIG. 11 illustrates the frequency spectrum of the various signals used by a cable television system incorporating the headend of FIG. 1.

FIG. 11 indicates the frequency spectrum of the various signals used by the television system. The spectrum to the left of the left-to-right arrow in FIG. 11 indicates upstream data, whereas the spectrum to the right of the right-to-left arrow in FIG. 11 indicates downstream data Interactive channels (NTSC video or MPEG2) are in channels 74–79 (522 MHZ to 552 MHZ). Upstream data has a small bandwidth of 25 kHz in the frequency range of 5 MHZ to 40 MHZ.

Figure 12:
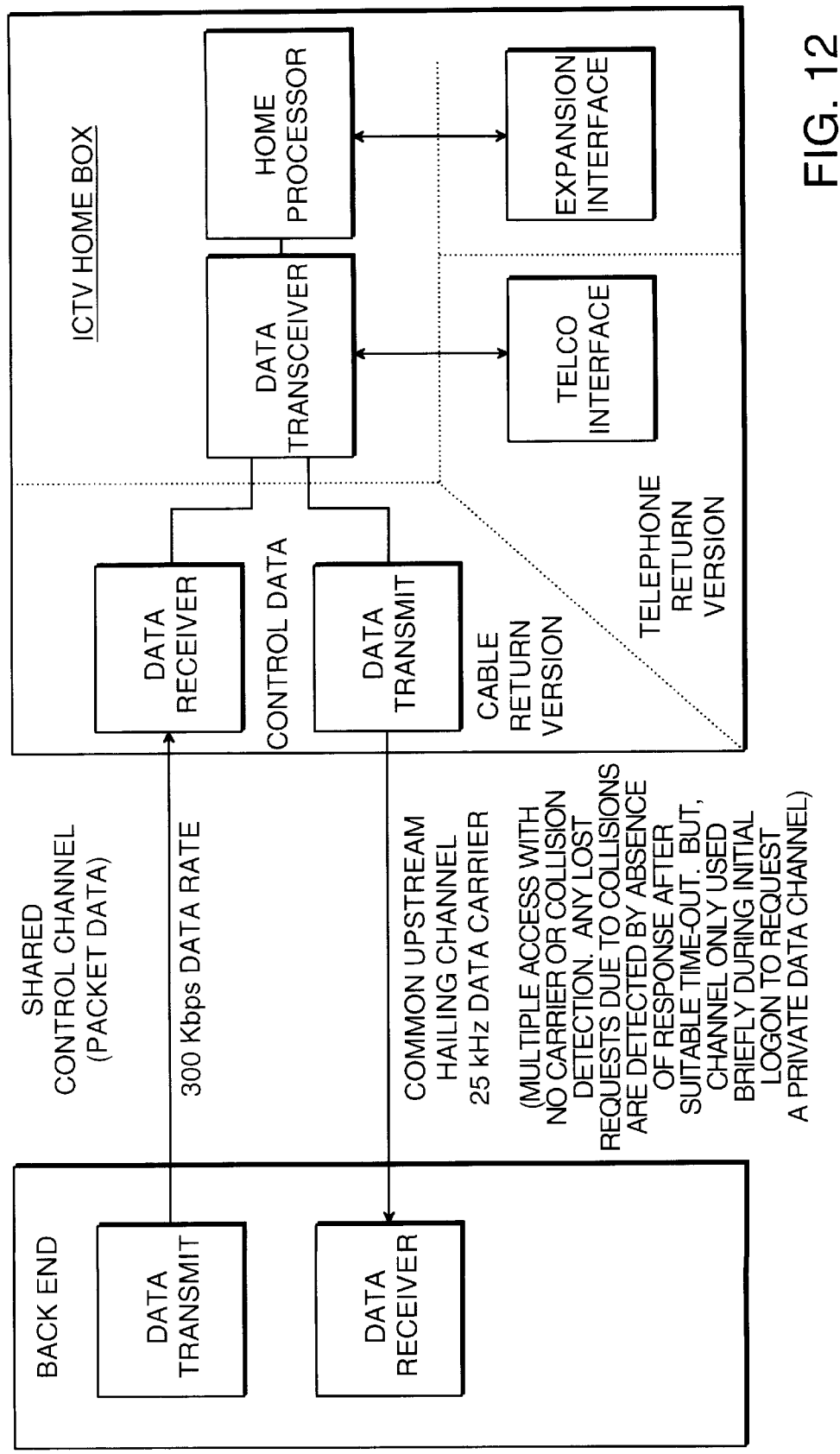
FIG. 12 is a high-level diagram of a home interface controller in communication with the back end.
Figure 13:
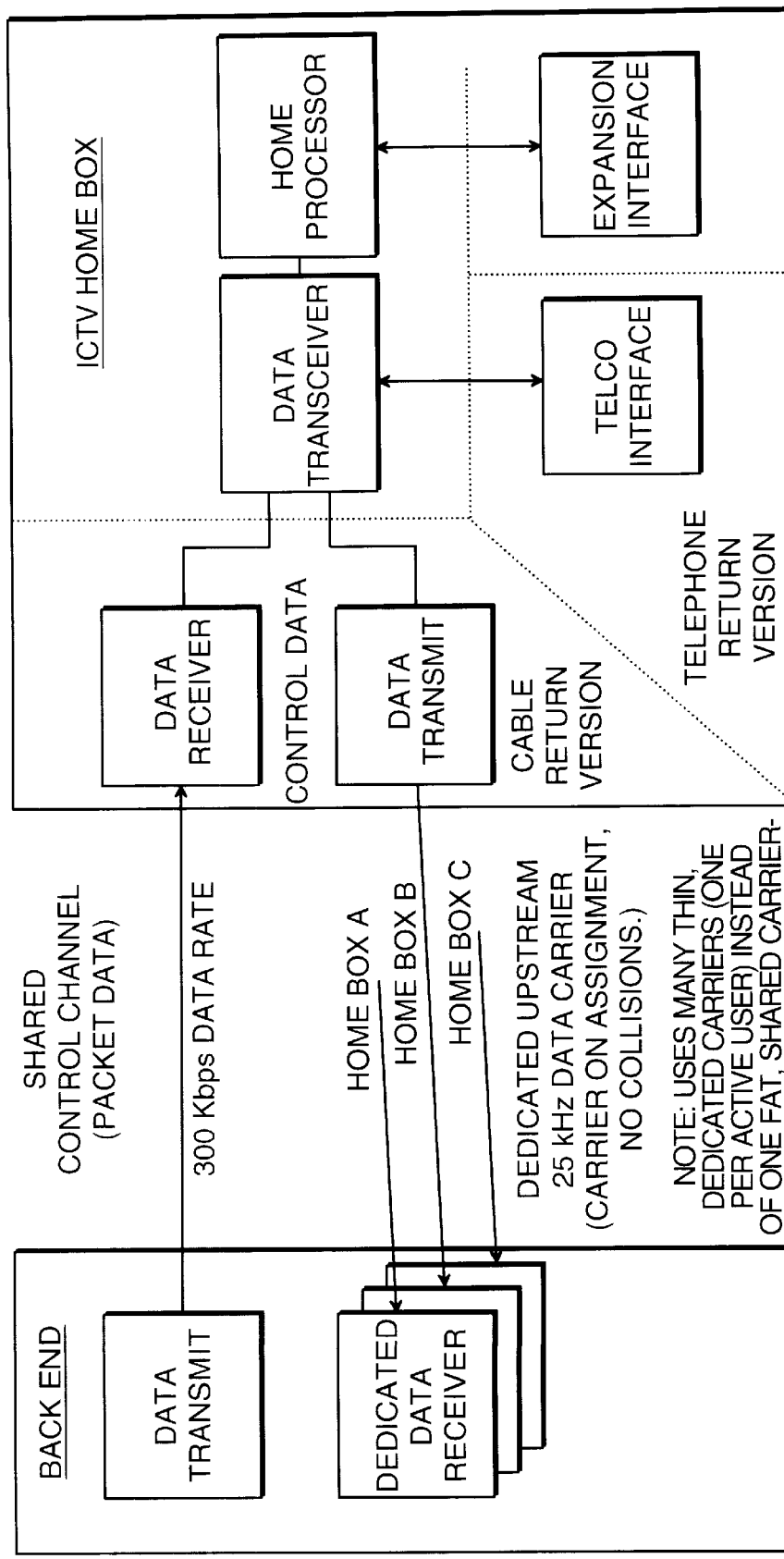
FIG. 13 is a high-level diagram illustrating a cable return system.

FIG. 12 shows a high-level diagram of the home interface controller in communication with the back end. In this embodiment, downstream data is in the form of packet data on a 300 Kbps data channel. When providing upstream data, the home interface controller uses a dedicated upstream channel requiring only a 25 kHz bandwidth for each home interface controller, so as to provide noise immunity. FIG. 12 is similar to FIG. 11, except that a common upstream channel is used by all the home interface controllers for hailing the back end. No carrier or collision detection algorithms are employed, but rather, any lost requests due to collisions among the home interface controllers are "detected" by an absence of response from the back end after a suitable time-out. This common upstream channel is used only briefly during an initial log-on to request a private data channel, where the private data channel is indicated in FIG. 13. As an alternative to the use of a hailing channel, the system manager may include an arrangement for the periodic broadcast, from the headend over a downstream portion of the data link to the home interface controllers, identifying of available channels; in this embodiment, each home interface controller has a rule for picking one of the available channels for use by the transmitter of its data transceiver.

What is claimed is:

1. A cable system headend connected to an information service distribution network, for delivering information services to subscriber televisions each associated with a home interface controller, the headend comprising:

a plurality of individually assignable processors each for receiving data communications from an assigned home interface controller and for generating information signals to be supplied over television signals through the information service distribution network to the subscriber television of the assigned home interface controller;

a frame server in communication with a plurality of home interface controllers each assigned to one of a plurality of processes running in said frame server for interactive service, said processes receiving data communications from the subscribers associated with their respective assigned home interface controllers said frame server generating interactive pages responsive to the data communications and supplying the interactive pages to the subscriber televisions associated with the assigned home interface controllers in digitally encoded television signals over the information service distribution network; and a system manager in data communication with the home interface controllers for assigning said frame server or one of said plurality of individually assignable processors to a home interface controller requesting interactive service.

2. The cable system headend of claim 1 wherein the information service distribution network comprises a plurality of cables each serving a different service area and further comprising a switch for directing each television signal from one of said plurality of individually assignable processors to the cable serving the service area in which the respective assigned home interface controller is served.

3. The cable system headend of claim 2 further comprising a common channel transmitted throughout the information service distribution network for carrying the digitally encoded television signals from said frame server.

4. The cable system headend of claim 1 further comprising a common channel transmitted throughout the information service distribution network for carrying the digitally encoded television signals from said frame server.

5. An interactive cable system comprising:

(i) an information service distribution network, for delivering information services from a headend to subscriber television;

(ii) a plurality of home interface controllers, each home interface controller associated with a subscriber television and having a data transceiver operative over a data communications link to the headend;

(iii) a plurality of subscriber selection devices, each such device associated with a home interface controller and in communication with the data transceiver thereof;

(iv) a plurality of individually assignable processors, disposed at the headend, in assignable data communication with an assigned home interface controller and in television communication over the network with the subscriber television associated with the assigned home interface controller, and (v) a frame server in communication with a plurality of home interface controllers each assigned to one of a plurality of processes running in said frame server for interactive service, said processes receiving data communications from the subscribers associated with their respective assigned home interface controllers, said frame server generating interactive pages responsive to the data communications and supplying the interactive pages to the subscriber televisions associated with the assigned home interface controllers in digitally encoded television signals over the information service distribution network.

6. The interactive cable system of claim 5 wherein each of said home interface controllers includes a cursor control program responsive to signals from the associated subscriber selection device for displaying a cursor and moving the cursor on an image displayed on the associated subscriber television.

7. The interactive cable system of claim 5 wherein said information service distribution network comprises a plurality of cables each serving a different service area and wherein the interactive cable system further comprises a switch for directing each television signal from one of said plurality of individually assignable processors to the cable serving the service area in which the respective assigned home interface controller is served.

8. The interactive cable system of claim 7 further comprising a common channel transmitted throughout said information service distribution network for carrying the digitally encoded television signals from said frame server.

9. The interactive cable system of claim 5 further comprising a common channel transmitted throughout said information service distribution network for carrying the digitally encoded television signals from said frame server.

* * * * *